(12) United States Patent
Binnig et al.

(10) Patent No.: US 7,873,223 B2
(45) Date of Patent: Jan. 18, 2011

(54) COGNITION INTEGRATOR AND LANGUAGE

(75) Inventors: Gerd Binnig, Kottgeisering (DE);
Guenter Schmidt, Munich (DE); Arno Schaepe, Starnberg (DE)

(73) Assignee: Definiens AG, Munich (DE)

( * ) Notice: Subject to any disclaimer, the term of this patent is extended or adjusted under 35 U.S.C. 154(b) by 1084 days.

(21) Appl. No.: 11/511,930

(22) Filed: Aug. 28, 2006

(65) Prior Publication Data
US 2007/0122017 A1    May 31, 2007

Related U.S. Application Data

(63) Continuation-in-part of application No. PCT/EP2006/061498, filed on Apr. 10, 2006, and a continuation-in-part of application No. 10/687,477, filed on Oct. 15, 2003, now Pat. No. 7,146,380.

(30) Foreign Application Priority Data

Oct. 15, 2002    (DE)    ................... 102 48 013
Apr. 8, 2005    (DE)    ................ 10 2005 016 290

(51) Int. Cl.
    *G06K 9/62*    (2006.01)
(52) U.S. Cl. .................................. 382/224
(58) Field of Classification Search ................ 382/133, 382/165, 170, 224, 227; 706/55
    See application file for complete search history.

(56) References Cited

U.S. PATENT DOCUMENTS 4,922,432 A * 5/1990 Kobayashi et al. ............ 716/17
5,170,347 A * 12/1992 Tuy et al. .................... 345/419

(Continued)

FOREIGN PATENT DOCUMENTS

DE    199 08204 A1    10/1998

(Continued)

OTHER PUBLICATIONS

Kailash et al., A volume decomposition approach to machining feature extraction of casting and forging components, 2001, Computer-Aided Design, pp. 605-617.*

(Continued)

*Primary Examiner*—Brian P Werner
*Assistant Examiner*—Dennis Rosario
(74) *Attorney, Agent, or Firm*—Imperium Patent Works; Darien K. Wallace

(57) ABSTRACT

In a specification mode, a user specifies classes of a class network and process steps of a process hierarchy using a novel scripting language. The classes describe what the user expects to find in digital images. The process hierarchy describes how the digital images are to be analyzed. Each process step includes an algorithm and a domain that specifies the classes on which the algorithm is to operate. A Cognition Program acquires table data that includes pixel values of the digital images, as well as metadata relating to the digital images. In an execution mode, the Cognition Program generates a data network in which pixel values are linked to objects, and objects are categorized as belonging to classes. The process steps, classes and objects are linked to each other in a computer-implemented network structure in a manner that enables the Cognition Program to detect target objects in the digital images.

51 Claims, 29 Drawing Sheets

U.S. PATENT DOCUMENTS

| | | | | |
|---|---|---|---|---|
| 5,297,215 A * | 3/1994 | Yamagishi | ............... | 382/131 |
| 5,331,554 A * | 7/1994 | Graham | ............... | 707/5 |
| 5,383,472 A * | 1/1995 | Devlin et al. | ............... | 600/584 |
| 5,537,485 A | 7/1996 | Nishikawa et al. | ............... | 382/130 |
| 5,579,393 A * | 11/1996 | Conner et al. | ............... | 713/176 |
| 5,870,493 A | 2/1999 | Vogl et al. | ............... | 382/195 |
| 5,872,859 A | 2/1999 | Gur et al. | ............... | 382/128 |
| 5,966,701 A * | 10/1999 | Kohda et al. | ............... | 706/20 |
| 5,983,210 A * | 11/1999 | Imasaki et al. | ............... | 706/15 |
| 6,018,728 A | 1/2000 | Spence et al. | ............... | 706/20 |
| 6,058,206 A * | 5/2000 | Kortge | ............... | 382/159 |
| 6,058,322 A | 5/2000 | Nishikawa et al. | ............... | 600/408 |
| 6,075,878 A | 6/2000 | Yoshida et al. | ............... | 382/132 |
| 6,075,879 A | 6/2000 | Roehrig et al. | ............... | 382/132 |
| 6,246,782 B1 | 6/2001 | Shapiro et al. | ............... | 382/128 |
| 6,282,305 B1 | 8/2001 | Huo et al. | ............... | 382/128 |
| 6,320,976 B1 | 11/2001 | Murthy et al. | ............... | 382/128 |
| 6,324,532 B1 | 11/2001 | Spence et al. | ............... | 706/27 |
| 6,389,305 B1 | 5/2002 | Deban et al. | ............... | 600/427 |
| 6,453,058 B1 | 9/2002 | Murthy et al. | ............... | 382/128 |
| 6,574,357 B2 | 6/2003 | Wang | ............... | 382/132 |
| 6,625,303 B1 | 9/2003 | Young et al. | ............... | 382/132 |
| 6,650,766 B1 | 11/2003 | Rogers et al. | ............... | 382/132 |
| 6,757,665 B1 | 6/2004 | Unsworth et al. | ............... | 706/15 |
| 6,763,128 B1 | 7/2004 | Rogers et al. | ............... | 382/130 |
| 6,778,705 B2 | 8/2004 | Gutta et al. | ............... | 382/224 |
| 6,801,645 B1 | 10/2004 | Collins et al. | ............... | 382/130 |
| 6,937,776 B2 | 8/2005 | Li et al. | ............... | 382/260 |
| 6,944,603 B2 | 9/2005 | Bergan et al. | ............... | 706/45 |
| 6,950,814 B2 * | 9/2005 | Bergan et al. | ............... | 706/55 |
| 6,970,587 B1 | 11/2005 | Rogers | ............... | 382/132 |
| 7,437,004 B2 * | 10/2008 | Baatz et al. | ............... | 382/224 |
| 7,533,406 B2 | 5/2009 | Ludvig et al. | ............... | 725/110 |
| 7,711,672 B2 * | 5/2010 | Au | ............... | 706/55 |
| 2001/0031920 A1 * | 10/2001 | Kaufman et al. | ............... | 600/431 |
| 2002/0030811 A1 * | 3/2002 | Schindler | ............... | 356/318 |
| 2002/0041328 A1 * | 4/2002 | LeCompte et al. | ............... | 348/144 |
| 2002/0188436 A1 | 12/2002 | Schmidt et al. | ............... | 704/1 |
| 2002/0191823 A1 | 12/2002 | Wehrli et al. | ............... | 382/128 |
| 2003/0016869 A1 | 1/2003 | Laumeyer et al. | ............... | 382/190 |
| 2003/0035773 A1 * | 2/2003 | Totterman et al. | ............... | 424/9.1 |
| 2003/0223627 A1 | 12/2003 | Yoshida et al. | ............... | 382/128 |
| 2004/0148296 A1 | 7/2004 | Schaepe et al. | ............... | 707/100 |
| 2006/0277073 A1 | 12/2006 | Heilbrunn et al. | ............... | 705/3 |
| 2007/0081702 A1 | 4/2007 | Porat et al. | ............... | 382/128 |
| 2007/0237373 A1 | 10/2007 | Kiraly et al. | ............... | 382/128 |
| 2008/0008349 A1 | 1/2008 | Binnig et al. | ............... | 382/100 |
| 2008/0008367 A1 | 1/2008 | Franaszek et al. | ............... | 382/128 |
| 2010/0086185 A1 | 4/2010 | Weiss | ............... | 382/131 |

FOREIGN PATENT DOCUMENTS

| | | |
|---|---|---|
| WO | WO 01/45033 A2 | 6/2001 |
| WO | WO 0145033 A2 * | 6/2001 |

OTHER PUBLICATIONS

Sormz et al., Intelligent Process Planning Implemented As an Integrated Module of CIM, ASME: Proceedings of Design Engineering Technical Conferences, pp. 1-10.*

Galper et al., Computational Simulations of Biological Systems, 1994, Academic Press. Inc., Biocomputing: Informatics and Genome Projects, pp. 269-305.*

English translation of the international preliminary report on patentability in international application PCT/EP2006/061498, to which U.S. Appl. No. 11/511,930 claims priority (Oct. 18, 2007).

Benz, Hofmann, Willhauck, Lingenfelder and Heynen, "Multi-resolution, object-oriented fuzzy analysis of remote sensing data for GIS-ready information," ISPRS Journal of Photography & Remote Sensing, vol. 58, No. 3-4, Dec. 16, 2003; (XP002440464); pp. 239-258.

Ruan, Bürkle and Dudeck, "An object oriented design for automated navigation of semantic networks inside a medical data dictionary," Artificial Intelligence in Medicine, vol. 18, No. 1, Jan. 31, 2000 (XP002440465); pp. 83-103.

Apte, Morgenstern and Hong, "AI at IBM Research," IEEE Intelligent Systems, vol. 15, No. 6, Dec. 31, 2000 (XP002440466); pp. 51-57.

Schaepe, Urbani, Leiderer and Athelogou, "Fraktal hierarchische, prozess- und objektbasierte Bildanalyse. Anwendung in der biomedizinischen Mikroskopie," Bildverarbeitung fuer die Medizin 2003, Informatik Aktuell, Dec. 31, 2003, (XP002440467); 3 pages.

Schaepe, Urbani, Leiderer and Athelogou, "Fraktal hierarchische, prozess- und objektbasierte Bildanalyse. Anwendung in der biomedizinischen Mikroskopie," Bildverarbeiting fuer die Medizin, Mar. 9, 2003, pp. 206-210, XP002282616.

* cited by examiner

CLASS NETWORK

SPECIFY A CLASS NETWORK

PROCESS HIERARCHY

SPECIFY A PROCESS HIERARCHY

SPECIFICATION MODE

EXECUTION MODE

PERFORM DATA ANALYSIS AND GENERATE DATA NETWORK

EXECUTE PROCESS STEPS

GENERATE DOMAIN
OF PROCESS STEP

DATA NETWORK OF A 3-DIMENSIONAL OBJECT

Case Comparision, iCAD detected 81% similarity
| | | | |
|---|---|---|---|
| Annemarie Maier | | Karin Huber | |
| Last examination: | 22.03.2006 | Last examination: | 02.08.2003 |
| Born: | 26.04.1960 | Born: | 27.02.1962 |
| Diagnosis: | unknown | Diagnosis: | normal |
| Risks | Smoker, 2 cancer cases in family | Risks | none |
| Age of children | 16, 17 | Age of children | 14 |
More details...    More details...
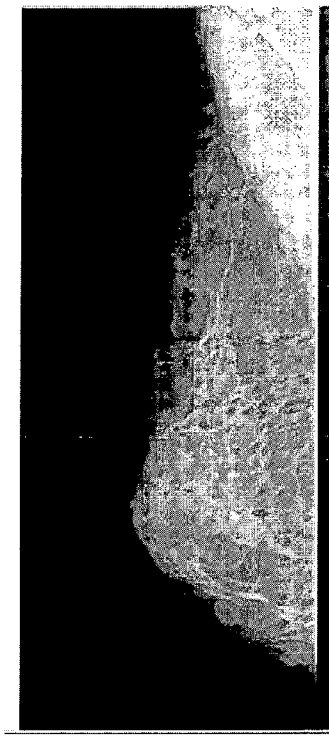
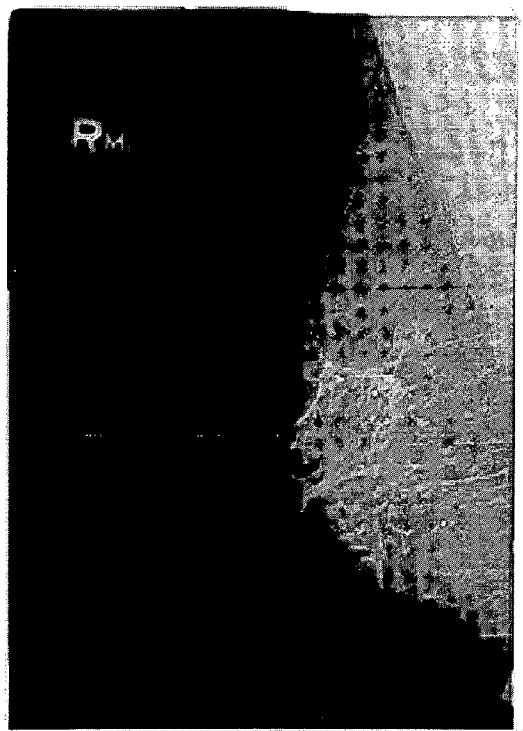
FIG. 20

```xml
<?xml version="1.0" encoding="UTF-8" ?>
- <eCog.Proc UserName="guenter" Company="Definiens AG" Copyright="" version="20050718"
    use-reproducable-poly="1" NumLvl="2" project-unit="1" engine-version="5.5.0" engine-
    build="534">
    <!-- Below are Image Layers -->
  + <ImgLayers>
    <!-- Below are Thematic Layers -->
  + <ThmLayers>
    <!-- Below are Map Levels -->
  + <MapLvlProxyCntnr>
    <ParamValueSetCntnr />
    <!-- Below are Variables for Process Steps -->
  + <ProcVrblCntnr>
    <!-- Below are the Classes of the Class Network; See e.g., FIG.4 -->
  + <ClssHrchy EvalInvalid="1" MinProb="0.10000000000000001"
      NNSlope="0.20000000000000001" PrjctBaseUnit="1" NumGlsChnl="1">
    <!-- Below are Samples for Training Cognition Network -->
  + <Smpls>
    <CustProcAlgrList />
    <!-- Below are Process Steps of Process Hierarchy; See FIG.6 -->
  - <ProcessList>
      <!-- Below is the Root Process Step of the Process Hierarchy; See 41 in FIG.6 -->
    + <ProcBase Name="mamma-v002" bLoopChg="0" iMaxCycle="1" bExpand="1"
        bActive="1" bAutoName="0" sComment="">
    </ProcessList>
    <ExportedItems />
    <LcnsIds />
  - <Behaviour>
      <DistCalc mode="CG" />
    </Behaviour>
  </eCog.Proc>
```

FIG. 24

```xml
<?xml version="1.0" encoding="UTF-8" ?>
- <eCog.Proc UserName="guenter" Company="Definiens AG" Copyright="" version="20050718" use-
    reproducable-poly="1" NumLvl="2" project-unit="1" engine-version="5.5.0" engine-build="534">
    <!-- Below are Image Layers -->
  + <ImgLayers>
    <!-- Below are Thematic Layers -->
  - <ThmLayers>
    + <ChnlProxyCntnr>
    </ThmLayers>
    <!-- Below are Map Levels -->
  - <MapLvlProxyCntnr>
    + <MapLvlProxy strName="New Level">
    + <MapLvlProxy strName="breasts" MapLvl="1">
    + <MapLvlProxy strName="fragments" MapLvl="2">
    </MapLvlProxyCntnr>
    <ParamValueSetCntnr />
    <!-- Below are Variables for Process Steps -->
  + <ProcVrblCntnr>
    <!-- Below are the Classes of the Class Network; See e.g., FIG.4 -->
  - <ClssHrchy EvalInvalid="1" MinProb="0.10000000000000001" NNSlope="0.20000000000000001"
    PrjctBaseUnit="1" NumGisChnl="1">
    - <AllClss>
        <!-- Below is the Calcification Class; See Fig.4 -->
      + <Clss id="1" name="calcification" flag="0" iMaskID="-1" termType="0" strUserName="guenter"
          tChngTime="1153208225" bShow="0" sComment="">
      + <Clss id="3" name="them-layer-classes" flag="2" iMaskID="-1" termType="0"
          strUserName="Guenter" tChngTime="1152872602" bShow="0" sComment="">
      + <Clss id="4" name="bg-near-breast" flag="0" iMaskID="-1" termType="0"
          strUserName="Guenter" tChngTime="1152872636" bShow="0" sComment="">
      + <Clss id="5" name="_active" flag="0" iMaskID="-1" termType="0" strUserName="Guenter"
          tChngTime="1152873535" bShow="0" sComment="">
      + <Clss id="6" name="bg-inner_border-vertical" flag="0" iMaskID="-1" termType="0"
          strUserName="Guenter" tChngTime="1152884587" bShow="0" sComment="">
      + <Clss id="7" name="bg-inner_border-horizontal" flag="0" iMaskID="-1" termType="0"
          strUserName="Guenter" tChngTime="1152884576" bShow="0" sComment="">
      + <Clss id="8" name="breast" flag="2" iMaskID="-1" termType="0" strUserName="Guenter"
          tChngTime="1152888599" bShow="0" sComment="">
      + <Clss id="9" name="bg" flag="0" iMaskID="-1" termType="0" strUserName="Guenter"
          tChngTime="1152888514" bShow="0" sComment="">
        <!-- Below is the Breast Skin Class; See FIG.4 -->
      + <Clss id="10" name="breast-skin" flag="0" iMaskID="-1" termType="0"
          strUserName="guenter" tChngTime="1153163063" bShow="0" sComment="">
        <!-- Below is the Left Craniocaudal Class; See FIG.4 -->
      - <Clss id="11" name="breast-lcc" flag="0" iMaskID="-1" termType="0" strUserName="guenter"
          tChngTime="1153166285" bShow="0" sComment="">
          <LcnsInfo tLcnsId="0" sPwd="" />
          <Scope GUID="00000000-0000-0000-0000-000000000000" />
          <Color R="255" G="192" B="87" />
          <SharedInfo bShared="0" strInstGUID="" />
          <!-- Below is the Right Craniocaudal Class; See FIG.4 -->
        </Clss>
      + <Clss id="12" name="breast-rcc" flag="0" iMaskID="-1" termType="0" strUserName="guenter"
          tChngTime="1153164053" bShow="0" sComment="">
        <!-- Below is the Left Mediolateral Oblique Class; See FIG.4 -->
      + <Clss id="13" name="breast-l-mlo" flag="0" iMaskID="-1" termType="0"
          strUserName="guenter" tChngTime="1153166438" bShow="0" sComment="">
```

FIG. 25A

```xml
<!-- Below is the Right Mediolateral Oblique Class; See FIG.4 -->
+ <Clss id="14" name="breast-r-mlo" flag="0" iMaskID="-1" termType="0"
    strUserName="guenter" tChngTime="1153164004" bShow="0" sComment="">          133
    <!-- Below is the Mammilla Class; See FIG.4 -->
+ <Clss id="15" name="mamilla" flag="0" iMaskID="-1" termType="0" strUserName="guenter"
    tChngTime="1153165610" bShow="0" sComment="">
+ <Clss id="16" name="_marked" flag="0" iMaskID="-1" termType="0" strUserName="guenter"
134   tChngTime="1153209169" bShow="0" sComment="">
    <!-- Below is a Helper Class for training the Cognition Network; See FIG.4 -->
+ <Clss id="17" name="_helpers" flag="2" iMaskID="-1" termType="0" strUserName="guenter"
    tChngTime="1153209187" bShow="0" sComment="">
+ <Clss id="18" name="links" flag="2" iMaskID="-1" termType="0" strUserName="guenter"
    tChngTime="1153209745" bShow="0" sComment="">
+ <Clss id="19" name="link-symmetry" flag="0" iMaskID="-1" termType="0"
    strUserName="guenter" tChngTime="1153209749" bShow="0" sComment="">
+ <Clss id="20" name="link-views" flag="0" iMaskID="-1" termType="0" strUserName="guenter"
    tChngTime="1153209764" bShow="0" sComment="">
  </AllClss>
+ <AllProps>
+ <ChnlWghtBrght>
+ <AllSubClss>
+ <AllTerm>
</ClssHrchy>
<!-- Below are Samples for Training Cognition Network -->
- <Smpls>
+ <AllClss>
+ <AllProp>
</Smpls>
<CustProcAlgrList />
<!-- Below are Process Steps of Process Hierarchy; See FIG.6 -->
- <ProcessList>
    <!-- Below is the Root Process Step of the Process Hierarchy; See 41 in FIG.6 -->
  - <ProcBase Name="mamma-v002" bLoopChg="0" iMaxCycle="1" bExpand="1" bActive="1"
      bAutoName="0" sComment="">
      <LcnsInfo tLcnsId="0" sPwd="" />
    + <Algorithm guid="A8BA5775-CC39-4194-9A6A-A64872EE1F81">
    + <Domain>
      <!-- Below is the Process Step "Initialization" 44 in FIG.6 -->
    - <SubProc>
      + <ProcBase Name="initialization" bLoopChg="0" iMaxCycle="1" bExpand="1" bActive="1"
          bAutoName="0" sComment="">
          <!-- Below is the Process Step "Detect Breasts" 45 in FIG.6 -->
        - <ProcBase Name="detect breasts" bLoopChg="0" iMaxCycle="1" bExpand="1" bActive="1"
            bAutoName="0" sComment="">
            <LcnsInfo tLcnsId="0" sPwd="" />
            <!-- Below is the Algorithm 60 for Process Step "Detect Breasts" 45 in
            FIG.6 -->
          + <Algorithm guid="A8BA5775-CC39-4194-9A6A-A64872EE1F81">
            <!-- Below is the Domain Specification 58 of Process Step "Detect
            Breasts" 45 in FIG.6 -->
          - <Domain>
            + <ProcDomain sThmLayer="" iNumMaxObj="0" iVersion="4">
            </Domain>
          - <SubProc>
```

FIG. 25B

```
<!-- Below is the Sub-Process Step "Segmentation" 50 in FIG.6 -->
- <ProcBase Name="segmentation" bLoopChg="0" iMaxCycle="1" bExpand="0"
    bActive="1" bAutoName="0" sComment="">
    <LcnsInfo tLcnsId="0" sPwd="" />
  + <Algorithm guid="A8BA5775-CC39-4194-9A6A-A64872EE1F81">
  + <Domain>
  + <SubProc>
  </ProcBase>
+ <ProcBase Name="at breasts: objects-mean = mean(Layer 1)" bLoopChg="0"
    iMaxCycle="1" bExpand="1" bActive="1" bAutoName="1" sComment="">
  <!-- Below is the Sub-Process Step "Classification" 51 in FIG.6 -->
- <ProcBase Name="classification" bLoopChg="0" iMaxCycle="1" bExpand="0"
    bActive="1" bAutoName="0" sComment="">
    <LcnsInfo tLcnsId="0" sPwd="" />
  + <Algorithm guid="A8BA5775-CC39-4194-9A6A-A64872EE1F81">
  + <Domain>
  - <SubProc>
      <!-- Below is the Sub-Process Step "Breast Area" 53 in FIG.6 -
      ->
      - <ProcBase Name="breast-area-min = Number of pixels" bLoopChg="0"
          iMaxCycle="1" bExpand="1" bActive="1" bAutoName="1" sComment="">
          <LcnsInfo tLcnsId="0" sPwd="" />
          <!-- Below is the Algorithm 61 for Sub-Process Step "Breast
          Area" 53 in FIG.6 -->
        + <Algorithm guid="15EB83DD-5DE7-4f59-9CBD-60AA256ADFDE">
        + <Domain>
          <SubProc />
        </ProcBase>
      + <ProcBase Name="breast-area-min /= NUM_COLS" bLoopChg="0"
          iMaxCycle="1" bExpand="1" bActive="1" bAutoName="1" sComment="">
      + <ProcBase Name="breast-area-min /= NUM_ROWS" bLoopChg="0"
          iMaxCycle="1" bExpand="1" bActive="1" bAutoName="1" sComment="">
      + <ProcBase Name="breast-area-min /= 4" bLoopChg="0" iMaxCycle="1"
          bExpand="1" bActive="1" bAutoName="1" sComment="">
      + <ProcBase Name="with Mean Layer 1 > objects-mean at breasts:
          for all" bLoopChg="0" iMaxCycle="1" bExpand="0" bActive="1"
          bAutoName="1" sComment="">
    </SubProc>
  </ProcBase>
  + <ProcBase Name="breast at breasts: merge region" bLoopChg="0"
      iMaxCycle="1" bExpand="1" bActive="1" bAutoName="1" sComment="">
  + <ProcBase Name="breast at breasts: breast-lcc, breast-r-mlo, breast-rcc,
      breast-l-mlo *" bLoopChg="0" iMaxCycle="1" bExpand="1" bActive="1"
      bAutoName="1" sComment="">
  </SubProc>
</ProcBase>
<!-- Below is the Process Step "Detect Background" 46 in FIG.6 -->
+ <ProcBase Name="detect background" bLoopChg="0" iMaxCycle="1" bExpand="0"
    bActive="1" bAutoName="0" sComment="">
  <!-- Below is the Process Step "Detect Fragments" 47 in FIG.6 -->
- <ProcBase Name="detect fragments" bLoopChg="0" iMaxCycle="1" bExpand="0"
    bActive="1" bAutoName="0" sComment="">
    <LcnsInfo tLcnsId="0" sPwd="" />
  + <Algorithm guid="A8BA5775-CC39-4194-9A6A-A64872EE1F81">
  + <Domain>
  - <SubProc>
```

FIG. 25C

```xml
<!-- Below is the Sub-Process Step "Mamilla Segmentation" 54 in FIG.6
-->
- <ProcBase Name="prepare mamilla segmentation" bLoopChg="0" iMaxCycle="1"
    bExpand="0" bActive="1" bAutoName="0" sComment="">
    <LensInfo tLensId="0" sPwd="" />
  + <Algorithm guid="A8BA5775-CC39-4194-9A6A-A64872EE1F81">
  + <Domain>
  - <SubProc>
      <!-- Below is the Sub-Process Step "Detect Skin" 57 in FIG.6 -
      ->
      + <ProcBase Name="detect skin" bLoopChg="0" iMaxCycle="1" bExpand="0"
          bActive="1" bAutoName="0" sComment="">
      + <ProcBase Name="detect mamilla region (TODO: enhance this to
          handle 2 views)" bLoopChg="0" iMaxCycle="1" bExpand="0" bActive="1"
          bAutoName="0" sComment="">
    </SubProc>
  </ProcBase>
+ <ProcBase Name="segmentation" bLoopChg="0" iMaxCycle="1" bExpand="0"
    bActive="1" bAutoName="0" sComment="">
<!-- Below is the Process Step "Link Mammillae" 55 in FIG.6 -->
- <ProcBase Name="link mamillae" bLoopChg="0" iMaxCycle="1" bExpand="1"
    bActive="1" bAutoName="0" sComment="">
    <LensInfo tLensId="0" sPwd="" />
  + <Algorithm guid="A8BA5775-CC39-4194-9A6A-A64872EE1F81">
  + <Domain>
  - <SubProc>
    - <ProcBase Name="mamilla with Existence of super objects breast-rcc
        (1) > 0 at fragments: for all" bLoopChg="0" iMaxCycle="1"
        bExpand="1" bActive="1" bAutoName="1" sComment="">
        <LensInfo tLensId="0" sPwd="" />
      - <Algorithm guid="A8BA5775-CC39-4194-9A6A-A64872EE1F81">
          <Params />
        </Algorithm>
      - <Domain>
        - <ProcDmnFtrLvl>
          - <ProcDomain sThmLayer="" iNumMaxObj="0" iVersion="4">
            - <mClssFltr eState="2" bUnclsfy="0" bUseDmnTxt="1">
              - <IClss>
    135 ─┤     - <DListInt>
                   <int value="15" />
                 </DListInt>
              </IClss>
            </mClssFltr>
            + <TermThrsh eCmpr="3" eBaseUnit="0">
          </ProcDomain>
          + <MapLvlProxy strName="fragments" MapLvl="2">
        </ProcDmnFtrLvl>
      </Domain>
      + <SubProc>
    </ProcBase>
```

FIG. 25D

```
        + <ProcBase Name="mamilla with Existence of super objects breast-l-
          mlo (1) > 0 at fragments: for all" bLoopChg="0" iMaxCycle="1"
          bExpand="1" bActive="1" bAutoName="1" sComment="">
        </SubProc>
      </ProcBase>
    </SubProc>
  </ProcBase>
  <!-- Below is the Process Step "Helper Classes" 48 in FIG.6 -->
- <ProcBase Name="helpers" bLoopChg="0" iMaxCycle="1" bExpand="1" bActive="0"
    bAutoName="0" sComment="">
    <LcnsInfo tLcnsId="0" sPwd="" />
  + <Algorithm guid="A8BA5775-CC39-4194-9A6A-A64872EE1F81">
  + <Domain>
  - <SubProc>
      + <ProcBase Name="class-storage" bLoopChg="0" iMaxCycle="1" bExpand="1"
          bActive="0" bAutoName="0" sComment="">
      + <ProcBase Name="at fragments: unlink all[from any if 0%
          <=weight<=100%]" bLoopChg="0" iMaxCycle="1" bExpand="1"
          bActive="1" bAutoName="1" sComment="">
      </SubProc>
    </ProcBase>
  </SubProc>
</ProcBase>
</ProcessList>
<ExportedItems />
<LcnsIds />
+ <Behaviour>
</eCog.Proc>
```

FIG. 25E

KEY TO FIG. 25

FIG. 25

COGNITION INTEGRATOR AND LANGUAGE

CROSS REFERENCE TO RELATED APPLICATION

This application is a continuation in part of, and claims priority under 35 U.S.C. §120 from, PCT application PCT/EP2006/061498 filed on Apr. 10, 2006, which designates the United States and which in turn is a continuation application of German Application No. DE 102005016290.8. This application claims the benefit under 35 U.S.C. §119 from German Application No. DE 102005016290.8 filed on Apr. 8, 2005, in Germany. This application is also a continuation in part of, and claims priority under 35 U.S.C. §120 from, nonprovisional U.S. patent application Ser. No. 10/687,477 entitled "Extracting Information from Input Data Using a Semantic Cognition Network," filed on Oct. 15, 2003 now U.S. Pat. No. 7,146,380. Application Ser. No. 10/687,477 in turn is a continuation of, and claims the benefit under 35 U.S.C. §119 from, German Application No. 102 48 013.3, filed on Oct. 15, 2002, in Germany. The subject matter of each of the foregoing documents is incorporated herein by reference.

TECHNICAL FIELD

The present invention relates generally to locating specified image structures in digital images, and more specifically to a computer-implemented system for automatically detecting cancerous mass lesions and micro-calcifications in mammograms.

CROSS REFERENCE TO COMPACT DISC APPENDIX

The Compact Disc Appendix, which is a part of the present disclosure, is one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Systems for detecting and analyzing target patterns in digital imagery have a wide variety of uses. Such systems can be used to detect geographical objects, military targets or weather patterns from satellite images. Radar or sonar shadows of airplanes, ships, submarines and schools of fish can also be detected and analyzed. Much effort has been expended to develop systems for detecting and analyzing anatomical regions in radiological images. For example, systems for analyzing computed tomography (CT) images are used for the computer-aided detection (CAD) of cancerous regions in human lungs.

One of the more difficult tasks of detecting patterns in medical images involves detecting cancerous mass lesions and micro-calcifications in X-ray images of breasts (also called mammograms). Early detection of these cancerous regions in the breast increases the chance of survival of women with breast cancer. The X-ray images are digitized, and the pixel data is analyzed. Detecting cancerous regions in breasts is made more difficult, however, by the similar appearance of pixels associated with benign and malignant lesions and micro-calcifications.

Systems for computer-assisted interpretation of mammograms are now widely used to assist in the early detection of breast cancer. Such systems include ImageChecker by R2 Technologies of Sunnyvale, Calif.; Second Look by CADx Systems of Beavercreek, Ohio and MammoReader by iCAD of Hudson, N.H. These systems are designed to provide very high detection rates of cancerous regions at the expense of "detecting" a significant number of regions that are not cancerous. As the probability threshold of missing a cancerous region is lowered, the rate of incorrectly designating cancerous regions increases. Thus, although current systems have achieved a high degree of sensitivity, there remains a tradeoff between the probability threshold for detected objects and the false positive detection rate. Systems employing computer-aided detection (CAD) of early breast cancer can, therefore, be improved by decreasing the false positive detection rate while maintaining the detection of nearly all cancerous regions.

Current CAD schemes for analyzing mammograms to detect breast cancer involve rules-based selection of abnormal regions. The rules are based on pixel filtering and thresholding and the dimensions and orientation of the target region. For example, pixel data from a mammogram is filtered according to brightness or intensity, and pixels with a similar brightness are associated together as an object. A gradient histogram is used to indicate the statistical distribution of brightness among all pixels of the mammogram. The histogram is then used to define thresholds for the brightness of pixels that are associated together. In addition to filtering and thresholding, the distance of one pixel from another pixel may be used to determine whether pixels are associated together. For example, the spatial orientation and the ratio of the dimensions of an area of brightness may be used to determine whether the area is cancerous. Once the CAD scheme has been developed, however, the process of detecting abnormal regions is static. Although the threshold and filtering variables and the target dimensions can be adjusted, the process in which the rules are applied does not change once the CAD scheme begins analyzing a particular digital image.

An improved CAD scheme is sought for locating specified image structures in a digital image that decreases the false positive detection rate while detecting substantially all of the target objects in the digital image. Such an improved CAD scheme is desired in which the process itself adapts to the characteristics of the digital image in which the target objects are located. Moreover, such an improved CAD scheme would detect an object in a digital image by employing processes in addition to associating pixels with an object based on filtering and thresholding pixels and on the dimensions of the object.

SUMMARY

A Cognition Program performs computer-aided detection (CAD) of target objects found in data tables. In one aspect, the data tables include text data as well as pixel values that make up digital images. At run time, the Cognition Program links similar pixel values to objects (nodes) of a data network.

In a specification mode, a user of the Cognition Program uses a novel scripting language to specify classes of a class network and process steps of a process hierarchy. The classes describe what the user expects to find in the digital images. The process hierarchy describes how the digital images are to be analyzed in order to find a target object. Each process step includes a domain specification and an algorithm. The domain specifies the classes whose associated objects will be operated upon by the algorithm in an execution mode at run time. The user also specifies types of links that are to connect objects of the data network, process steps and classes to each other. In addition, the user specifies link types for links between process steps and classes and between classes and objects. A link between two nodes describes the relationship between the two nodes.

The Cognition Program acquires table data values that include the pixel values of the digital images, as well as metadata relating to the digital images, such as the text data. In one example, the digital images are the left and right side views and left and right top views of a mammogram of a patient who is suspected of having breast cancer, and the metadata is information relating to the patient. The Cognition Program integrates the information of the four digital images and the metadata.

In the execution mode, the Cognition Program generates the data network in which pixel values are linked to objects, and objects are categorized as belonging to specific classes. Moreover, the Cognition Program generates a computer-implemented network structure that includes the data network, the process hierarchy and the class network. In the computer-implemented network structure, the process steps, classes and objects are linked to each other in a manner that enables the Cognition Program to detect a target object in the digital images that is defined by a class. For example, an algorithm of a process step may be linked to an item of metadata, or a domain specification of a process step may be linked to an object of the data network. The Cognition Program and novel scripting language can also be used to analyze satellite images to detect specific ships in a harbor.

In another aspect, the data network is generated from many data tables, each containing a digital image. By generating the data network from digital images obtained from many parallel planar slices of a three-dimensional data set of a physical object, the Cognition Program detects three-dimensional target regions in the physical object.

In yet another aspect, the table data values acquired by the Cognition Program are obtained from a first group of parallel planar scans of a three-dimensional physical object taken at one time and from a second group of parallel planar scans of the three-dimensional physical object taken at a different time. Generating the computer-implemented network structure enables the Cognition Program to depict movement of the three-dimensional physical object.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 20 is a screenshot output by the Cognition Program comparing two mammograms that have been chosen because of their similarities.

FIG. 24 is a listing of high-level lines of XML code corresponding to a Cognition Language script that implements a class network and a process hierarchy for analyzing mammograms.

FIGS. 25A-E show more lines of the XML code of FIG. 24.

DETAILED DESCRIPTION

Reference will now be made in detail to some embodiments of the invention, examples of which are illustrated in the accompanying drawings.

Figure 1:
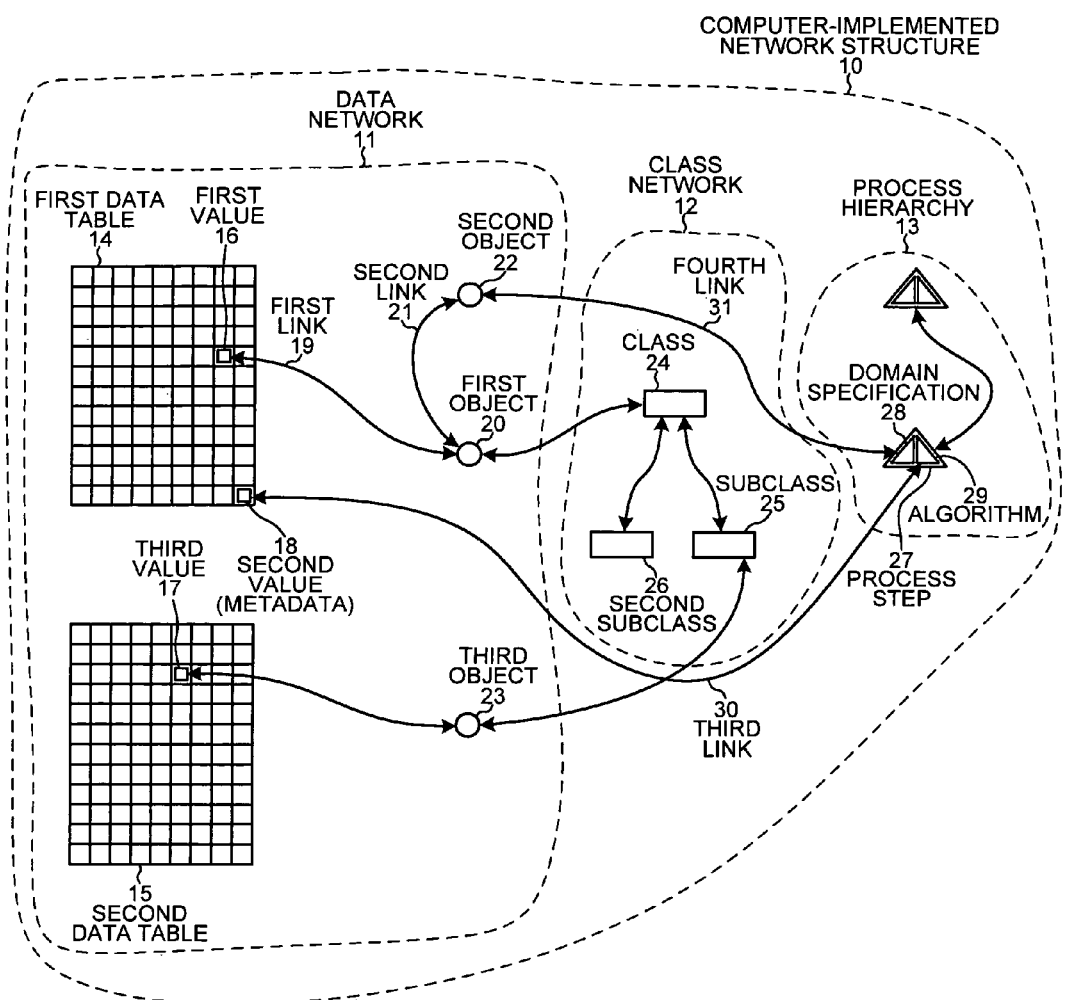
FIG. 1 is a simplified schematic diagram of a computer-implemented network structure that includes a data network, a class network and a process hierarchy.

FIG. 1 is a simplified diagram of a computer-implemented network structure 10 used to locate information of interest from among table data values. The network structure 10 includes a data network 11, a class network 12 and a process hierarchy 13. In the example of FIG. 1, data network 11 includes a first data table 14 and a second data table 15. The table data values in data tables 14-15 are in the form of both numbers and text.

In one embodiment, some of the table data values describe a medical patient, while other table data values are digital pixel values from a medical image of the patient. The patient is suspected of having breast cancer, and the medical image is a mammogram. Thus, some of the table data values are floating-point values representing the spectral intensity of individual pixels of the digitized mammogram. The other table data values are items of metadata relating to the mammogram, such as patient information relevant to whether the patient might have breast cancer. Examples of such information include the patient's gender, age, weight, height, blood values, prescribed medications, number of children, the family history of ailments, whether the patient breast-fed her children, whether the patient smoked or used drugs. In FIG. 1, a first value 16 and a third value 17 are spectral intensity values from the mammogram, whereas second value 18 is an item of metadata, such as the weight of the patient.

In this embodiment, network structure 10 is used for the detection of early breast cancer by identifying target regions on images of breasts. The visual inspection of mammograms is time consuming and labor intensive. Because of the low prevalence of target objects in the many mammograms read by clinical doctors and radiologists, tedium can cause the doctor or radiologist to overlook a target object when it is present. Network structure 10 and the associated computer program that generates network structure 10 help the doctor and radiologist to avoid overlooking any cancerous regions in the mammograms they are inspecting. The associated computer program is called the Cognition Program.

Figure 2:
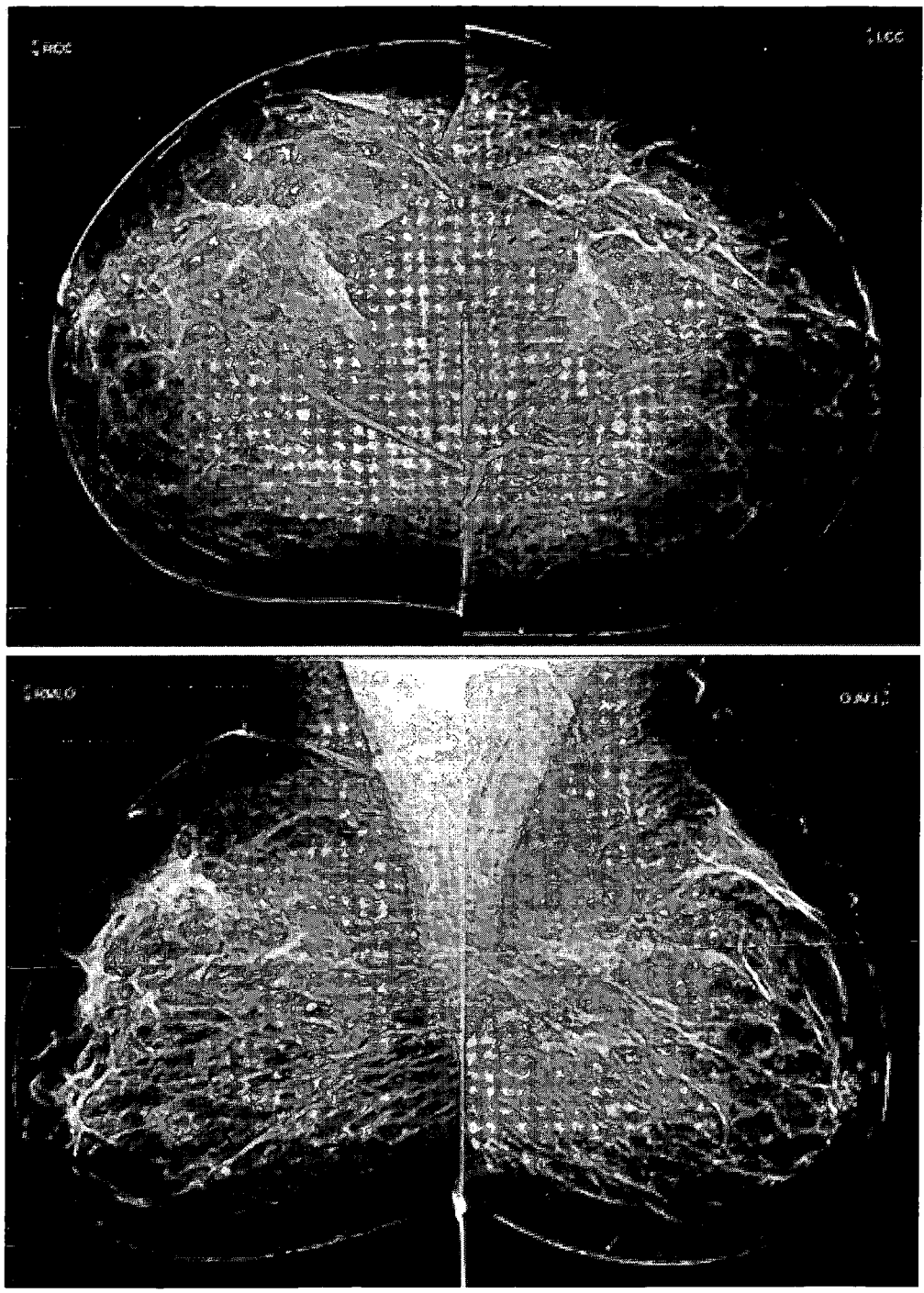
FIG. 2 is a digital image including the right and left craniocaudal views and the right and left mediolateral oblique views of a mammogram.

FIG. 2 is an example of an image that is analyzed by network structure 10 and the Cognition Program. The upper portion of the image shows a top craniocaudal (CC) view of a right and a left breast. The lower portion of the image shows a side mediolateral oblique (MLO) view of the same right and left breasts. Thus, first data table 14 includes the pixel data of the craniocaudal (CC) view plus items of metadata, and second data table 15 includes the pixel data of the mediolateral oblique (MLO) view. In other embodiments, second data table 15 also includes metadata relating to the patient. Network structure 10 is used to identify and mark target regions on FIG. 2 that are likely to contain cancerous mass lesions and micro-calcifications.

Returning to FIG. 1, data network 11 also includes objects and links. In this example, first value 16 is linked by a first link 19 to a first object 20. First object 20 is linked by a second link 21 to a second object 22. Data network 11 also includes a third object 23 that is linked to the third data value 17.

Class network 12 includes a class 24, a subclass 25 and a second subclass 26. Class 24 is linked to subclass 25 and to second subclass 26. In addition, class 24 of class network 12 is linked to first object 20 of data network 11. And subclass 25 is linked to third object 23. Process hierarchy 13 includes a process step 27. Process step 27 in turn includes a domain specification 28 and an algorithm 29. Algorithm 29 is linked by a third link 30 to the second value 18 of first data table 14. Domain specification 28 is linked by a fourth link 31 to the second object 22. Thus, an algorithm of a process step in process hierarchy 13 is linked to metadata in data network 11, and a domain specification of a process step in process hierarchy 13 is linked to an object in data network 11.

Figure 3:
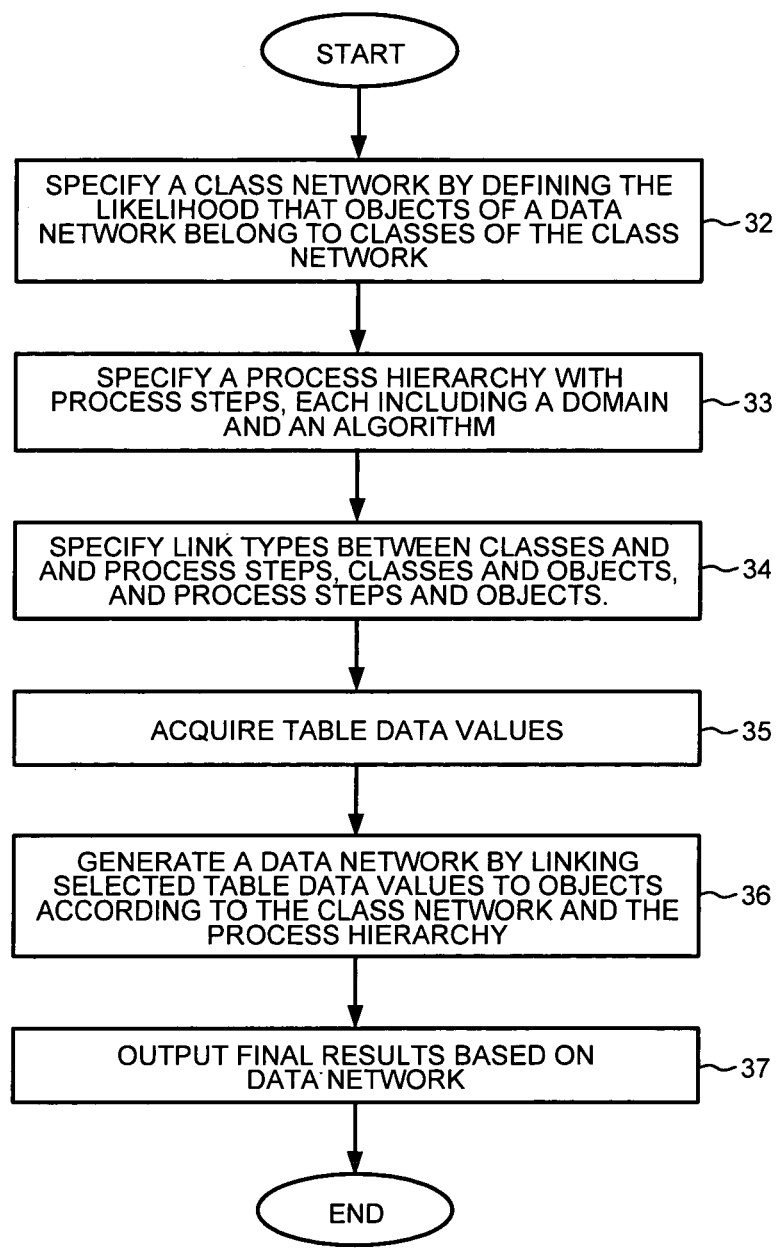
FIG. 3 is a flowchart of steps for performing computer-aided detection of target regions in digital images using the computer-implemented network structure of FIG. 1.

FIG. 3 is a flowchart illustrating steps 32-37 of a method by which network structure 10 and the Cognition Program together perform computer-aided detection (CAD) of target regions in digital images that depict cancerous mass lesions and micro-calcifications in human breasts. In other embodiments described below, network structure 10 is used to detect other objects. The steps of FIG. 3 will now be described in relation to the operation of network structure 10 of FIG. 1 and the Cognition Program.

In first step 32, a user of the Cognition Program specifies class network 12 by defining the likelihood that objects of data network 11 will belong to each particular class of class network 12. The user of the Cognition Program is, for example, a research doctor who is applying his expert knowledge to train the Cognition Program in a specification mode. In addition to the research doctor, clinical doctors then also use the Cognition Program in an execution mode.

Figure 4:
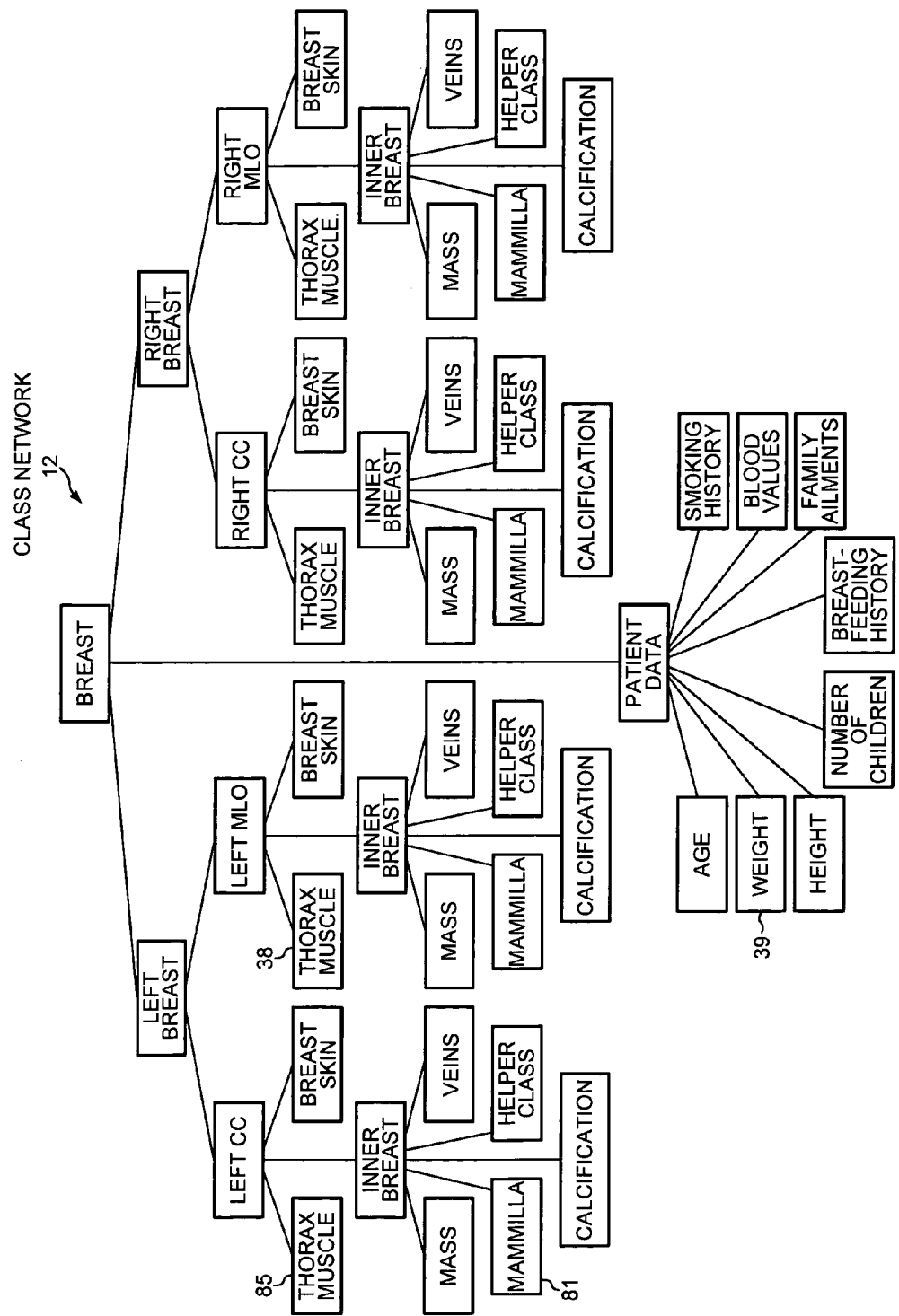
FIG. 4 is a diagram showing the class network of FIG. 1 in more detail.

FIG. 4 shows class network 12 of FIG. 1 in more detail. Class network 12 includes classes linked to subclasses that describe what the user expects to find in the digital images included in first data table 14 and second data table 15. Thus, in this example, the classes and subclasses of FIG. 4 describe what the user expects to see in the images of FIG. 2. The user starts by giving each class a name. In this example, the user has specified a left breast and a right breast, corresponding to the left and right sides of the mammogram of FIG. 2. For the left breast, for example, the user has specified a craniocaudal (CC) view and a mediolateral oblique (MLO) view, corresponding to the top and bottom portions of the mammogram of FIG. 2, respectively. For the left MLO view, for example, the user has specified classes for the thorax muscle 38, the breast skin and the inner breast. The thorax muscle corresponds to the white triangle in the upper right corner of the left MLO view in FIG. 2. The user has also specified subclasses for the "inner breast" subclass, including subclasses named breast mass, mammilla, micro-calcification, helper class and veins. The user specifies a helper class to categorize parts of the digital image for which the user does not know the contents.

The user also specifies categories of metadata. In this example, class network 12 includes a class for patient data and subclasses specifying the types of patient data. The user has specified subclasses for the patient's age, weight 39, height, number of children, whether the patient breast-fed her children, the patient's family history of ailments, the patient's blood values, and whether the patient smoked.

Each class may have an associated membership function that defines the probability that an object of data network 11 will belong to the particular class. The membership functions do not define whether an individual pixel value belongs to a class. Rather, each object is a group of pixels linked to the object, and the user specifies the membership function by defining the properties that the object must have to belong to the class. Examples of such properties include the area, shape, color and texture of the object. The area of an object may be determined, for example, by the number of pixels linked to the object. An item of metadata may also be a variable in a membership function. For example, the area of an object that belongs to the breast mass may be larger if the age and weight of the patient are over certain thresholds.

Figure 5:
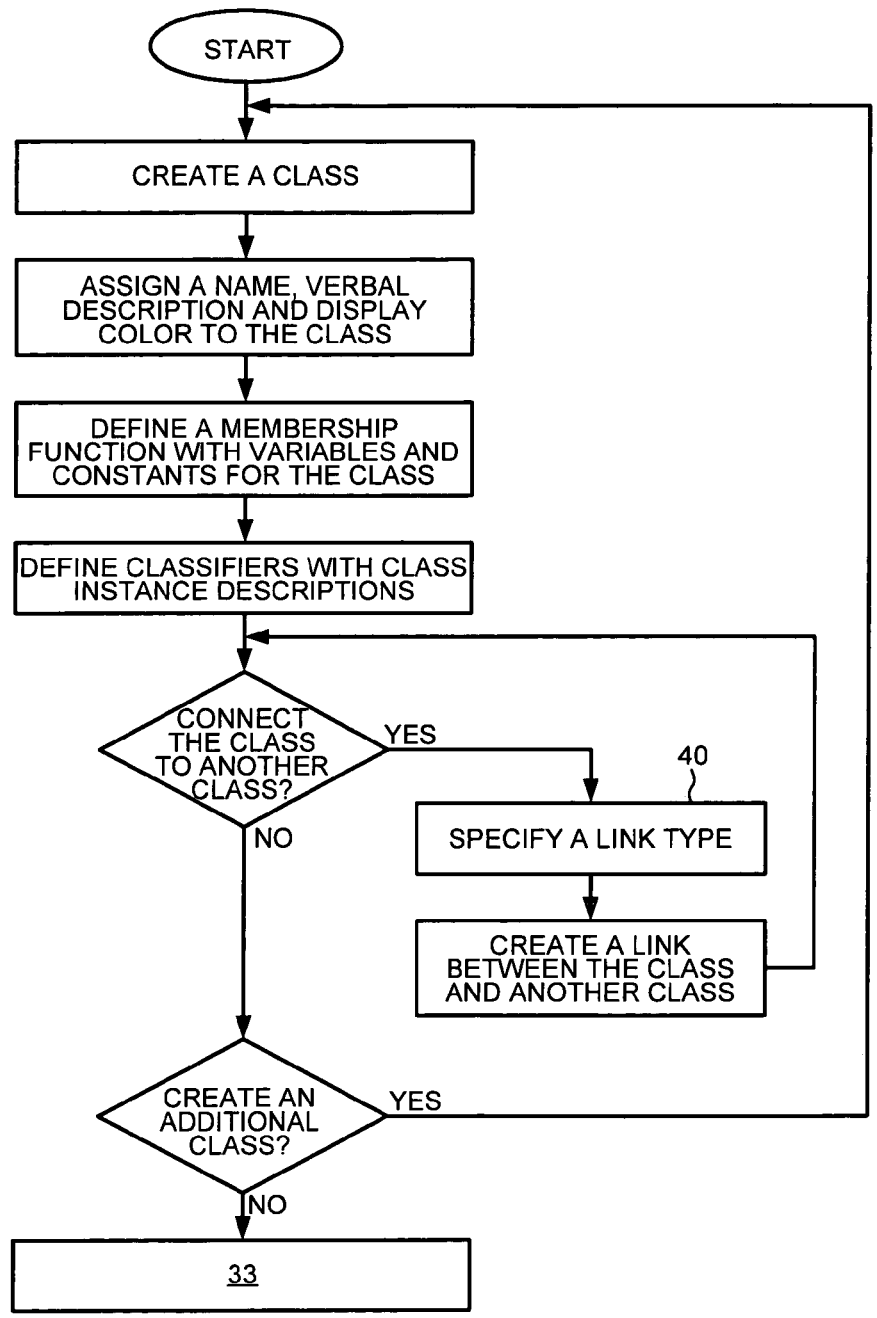
FIG. 5 is a flowchart showing the substeps of the first step of FIG. 3 for specifying the class network of FIG. 1.

FIG. 5 is a flowchart that illustrates the substeps of step 32 of FIG. 3 in more detail. In a substep 40, a link type for a link between two classes or subclasses is specified. Links that are not specified in substep 40 can also be specified later in step 34 of FIG. 3.

In step 33 of FIG. 3, the user specifies process hierarchy 13 of FIG. 1. The user specifies not only the individual process steps, but also the order in which the process steps are to be executed in the execution mode of the Cognition Program.

Thus, each process hierarchy has a root process step linked to other process steps. The process steps in turn may be linked to substeps.

Figure 6:
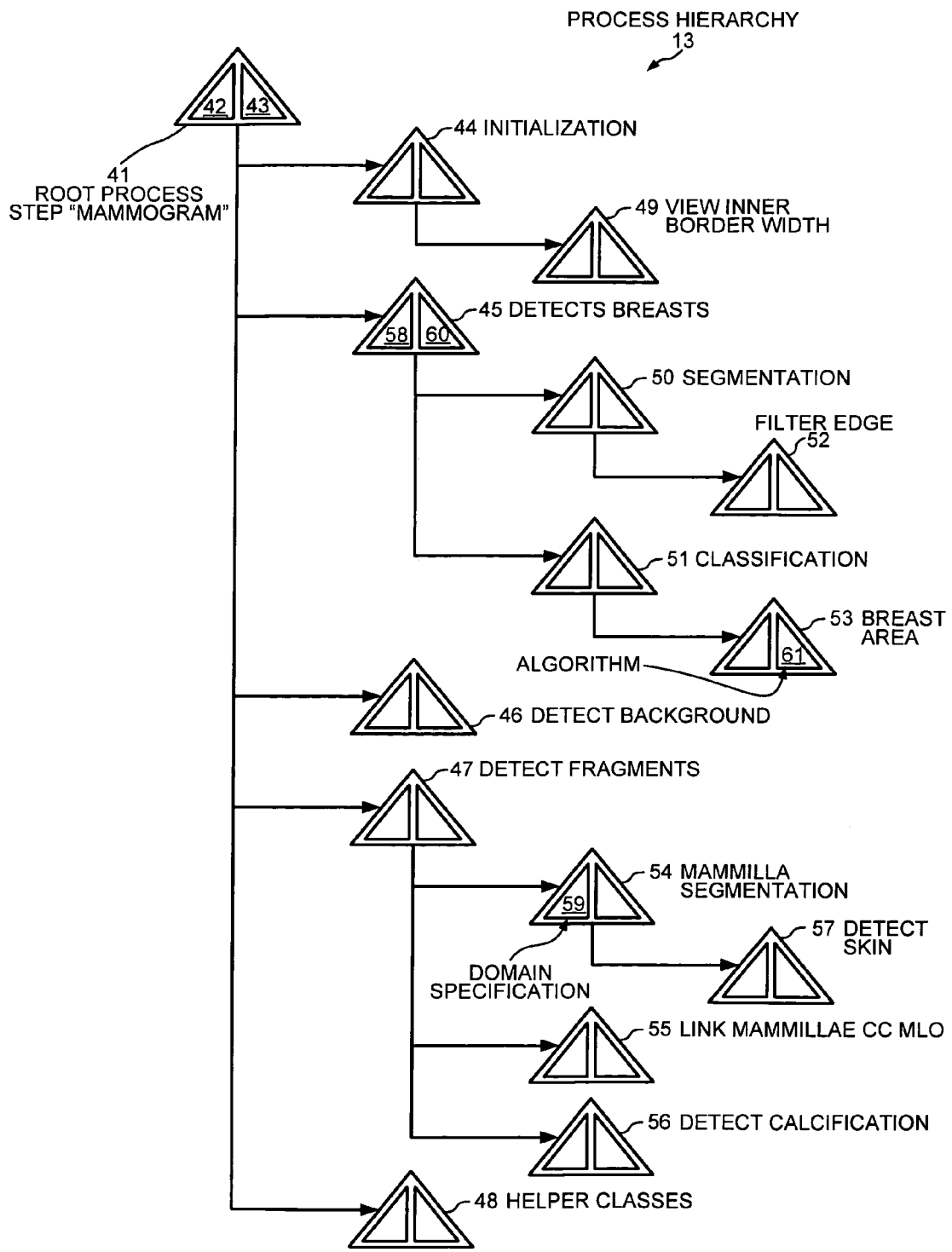
FIG. 6 is a diagram showing the process hierarchy of FIG. 1 in more detail.

FIG. 6 shows process hierarchy 13 of FIG. 1 in more detail. Process hierarchy 13 includes a root process step 41 named "Mammogram" with a domain specification 42 and an algorithm 43. In this example, the user has specified five process steps 44-48 linked in a specific order to root process step 41. The first process step 44 "Initialization" has a sub-process step 49 named "View Inner Border Width". The second process step 45 "Detect Breasts" has two sub-process steps 50-51, each with its own substep. Substep 50 "Segmentation" has a substep 52 named "Filter Edge". Substep 51 "Classification" has a substep 53 named "Breast Area". The third process step 47 "Detect Fragments" has three sub-process steps 54-56. Substep 54 "Mammilla Segmentation" has a substep 57 named "Detect Skin".

For each process step or sub-process step, the user has the option of specifying a domain and an algorithm. FIG. 6 shows that the user has specified a domain 58 for the process step 45 and a domain 59 for the sub-process step 54. The domain specifies classes that define the objects of data network 11 upon which the algorithm is to operate at run time in the execution mode. FIG. 6 also shows that the user has specified an algorithm 60 for the process step 45 and an algorithm 61 for the sub-process step 53.

Figure 7:
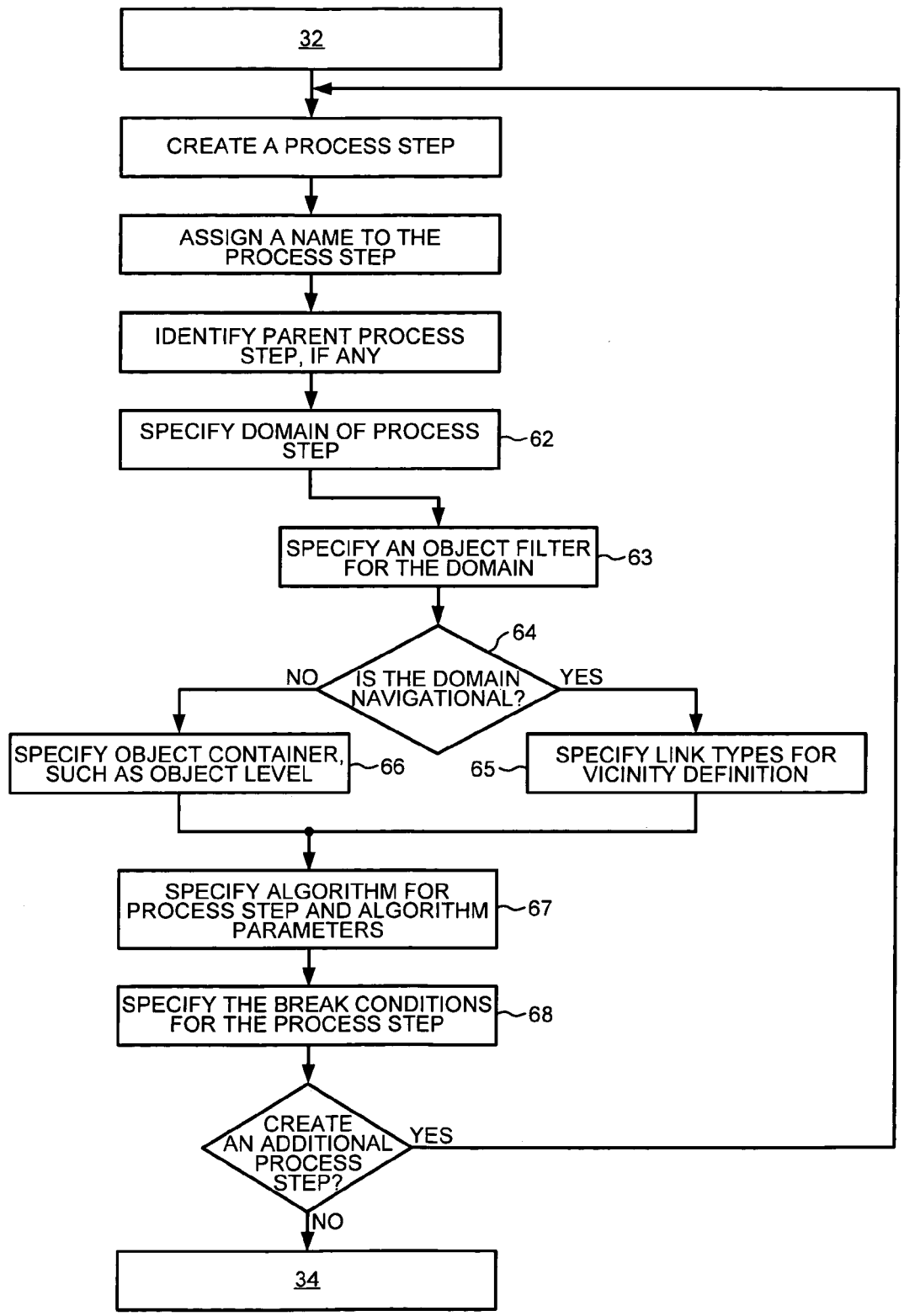
FIG. 7 is a flowchart showing the substeps of the second step of FIG. 3 for specifying the process hierarchy of FIG. 1.

FIG. 7 is a flowchart that illustrates the substeps of step 33 of FIG. 3 in more detail. In a substep 62, the user specifies the domain of the process process step that the user has created. In a substep 63, the user specifies an object filter for the domain. For example, from the objects within the domain, the object filter passes to the algorithm all of those objects that are linked to fewer than ten pixel values. In a decision substep 64, the Cognition Program queries the user as to whether the domain is navigational. The user is queried by a dialogue in a pop-up window. The domain is navigational when the objects to be operated upon are defined based on how they are linked to other objects. For example, a domain may include only those subobjects that are linked by a certain type of link to a parent objects. If the domain is navigational, in a substep 65 the user specifies the link types that define the vicinity of the parent object. If the domain is not navigational, in a substep 66 the user specifies an object container for the objects that are to be operated upon by the algorithm of the process step. For example, the object container can be all of the objects at a specified object level. The level of objects linked directly to table data values is referred to as object level zero. Objects linked directly to objects in object level zero are considered to be in object level one, and so forth.

In a substep 67 of step 33 of FIG. 3, the user specifies the algorithm that will operate on the objects specified in the domain. The user can choose preformulated algorithms from a database of algorithms accessed by the Cognition Program. For example, some algorithms are used for the segmentation of objects. Other algorithms are used for computation, such as for statistical calculations or to calculate the area of pixels linked to an object.

Figure 8:
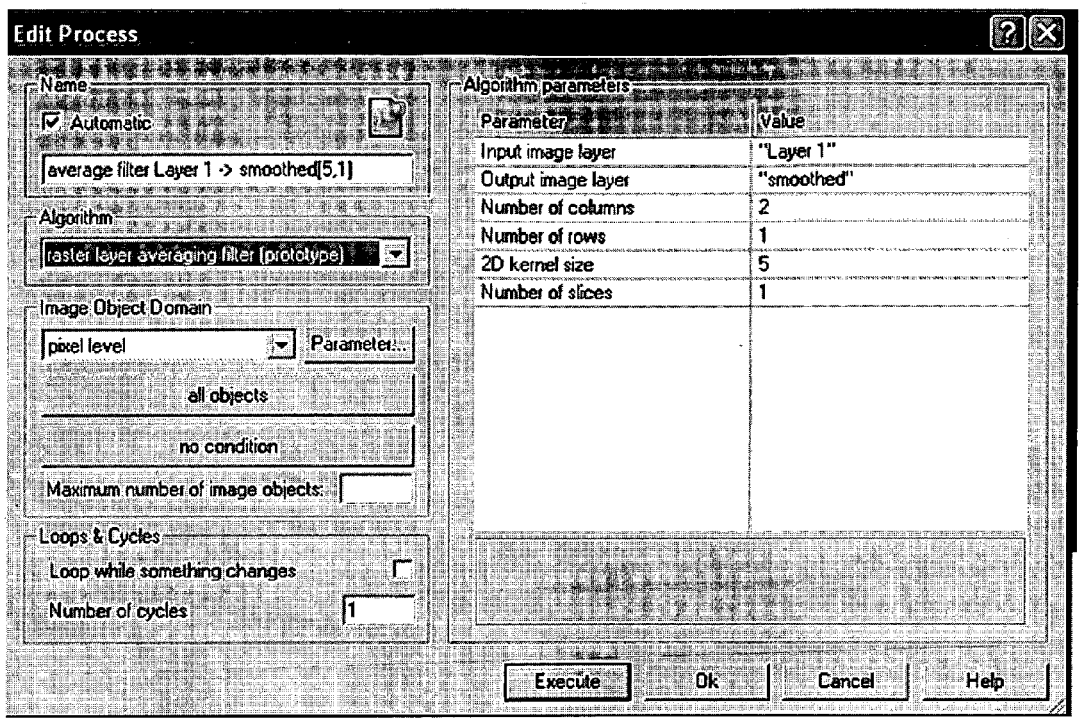
FIG. 8 is a screenshot of a pop-up window generated by a Cognition Program to assist in specifying an algorithm in a step of FIG. 7.

FIG. 8 shows a screenshot of a pop-up window generated by the Cognition Program to assist the user to specify the algorithm as described in substep 67.

In a substep 68, the user specifies a break condition at which the algorithm stops operating on objects. For example, the algorithm may be iterative and operate on a group of objects a predetermined number of times, as defined by the break condition.

In step 34 of FIG. 3, the user then specifies various types of links. In network structure 10, links can be between objects, between classes, and between process steps (collectively referred to here as nodes). In addition, there can be links between a class and an object, between a class and a process step, between a process step and an object, between a process step and table data, and between an object and table data. The links between a class and an object, between a process step and an object, and between an object and table data exit in network structure 10 only at run time during the execution mode of the Cognition Program. The user then uses the link types to define the relationship between the nodes of the class network and process hierarchy that the user specifies in the specification mode. In addition, the user uses the link types to define the relationship between the objects of the data network and the other nodes of network structure 10 that are to be generated at run time.

Figure 9:
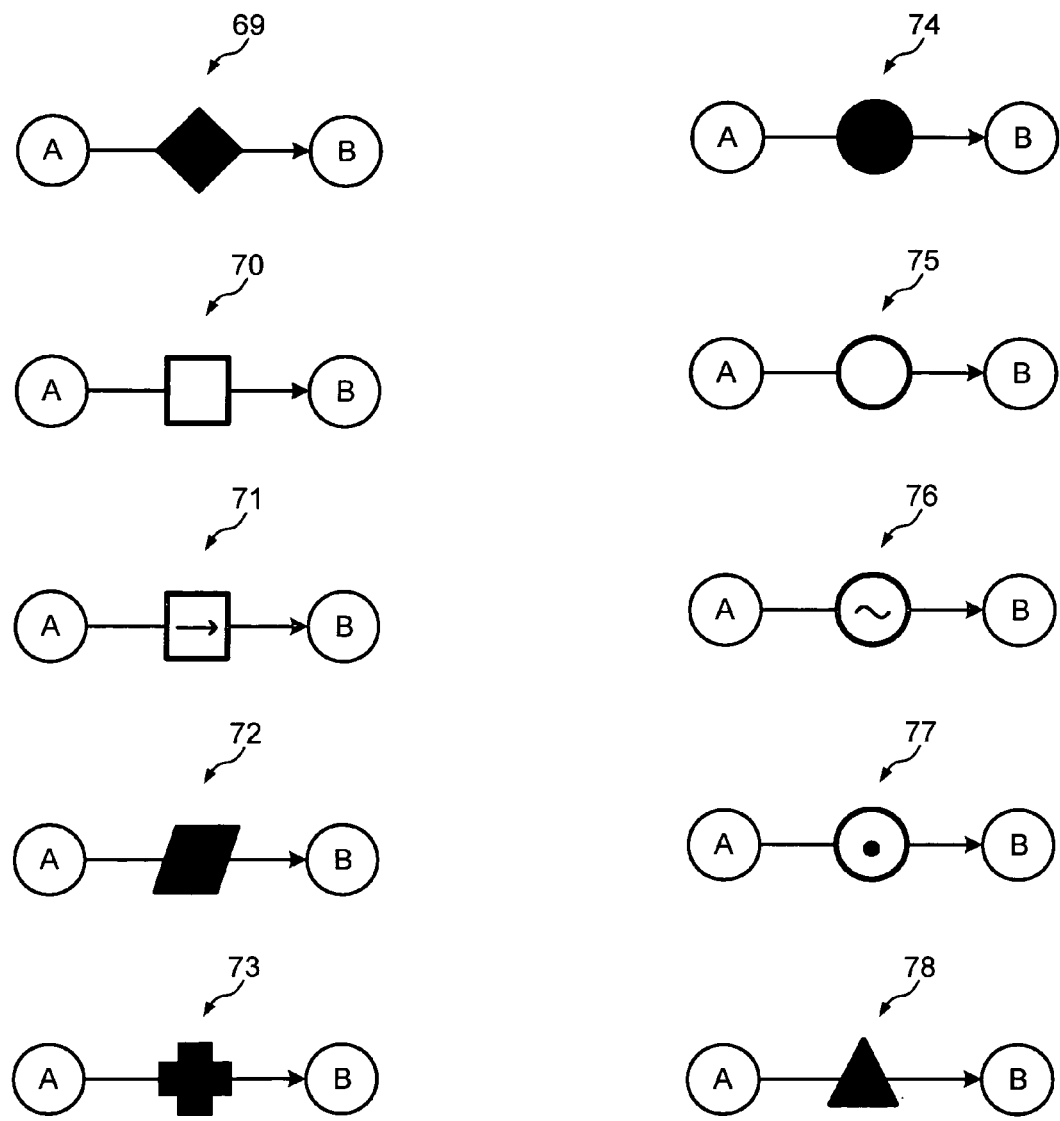
FIG. 9 is a diagram showing representations of various types of links in the computer-implemented network structure of FIG. 1.

FIG. 9 shows representations of various types of links 69-78 in network structure 10. The links describe the relation between the objects, classes and process steps. The most elementary types of links are either (i) exchange-relation links or (ii) relation links. Exchange-relation links describe an abstract, material or communicative exchange between nodes. Relation links, on the other hand, describe the relationship between nodes depending on relational contents. Where information is structured hierarchically, links are further subdivided into two groups. The first group links nodes at different hierarchy levels. The second group links nodes at the same hierarchy level.

Link 69 represents an exchange-relation link that connects nodes at different hierarchy levels. Link 69 represents the relationship between a larger, super-ordinated node A and a smaller, subordinated node B. Thus, link 69 represents a change in scale of information and denotes "B is part of A". Links 70-72 are exchange-relation links that connect nodes in the same hierarchy levels. These links do not represent a change in scale of information and denote "B is an output quantity of A". For example, the link 72 denotes "B is an attribute of A".

Link 73 represents a relation link that connects nodes at different hierarchy levels and thus performs a scale change. Link 73 denotes "B in general is A". Links 74-77 represent relation links that connect nodes in same hierarchy level. Link 75 denotes "A is locally adjacent to B"; link 76 denotes "A is similar to B"; and link 77 denotes "A is followed by B".

Link 78 represents a link that connects nodes that are capable of carrying out certain operations on other nodes and links. For example, a node connected to link 78 can generate new nodes or links and can also delete a node or a link. Link 78 denotes "B is function of A". For additional information on types of links in a semantic network structure, see U.S. patent application Ser. No. 11/414,000 entitled "Situation Dependent Operation of a Semantic Network Machine," filed on Apr. 28, 2006, which is incorporated herein by reference.

Although in the embodiment of FIG. 3 the link types are specified in step 34 after the class network and the process hierarchy are specified, in other embodiments the link types are specified before the class network and the process hierarchy are specified.

Figure 10:
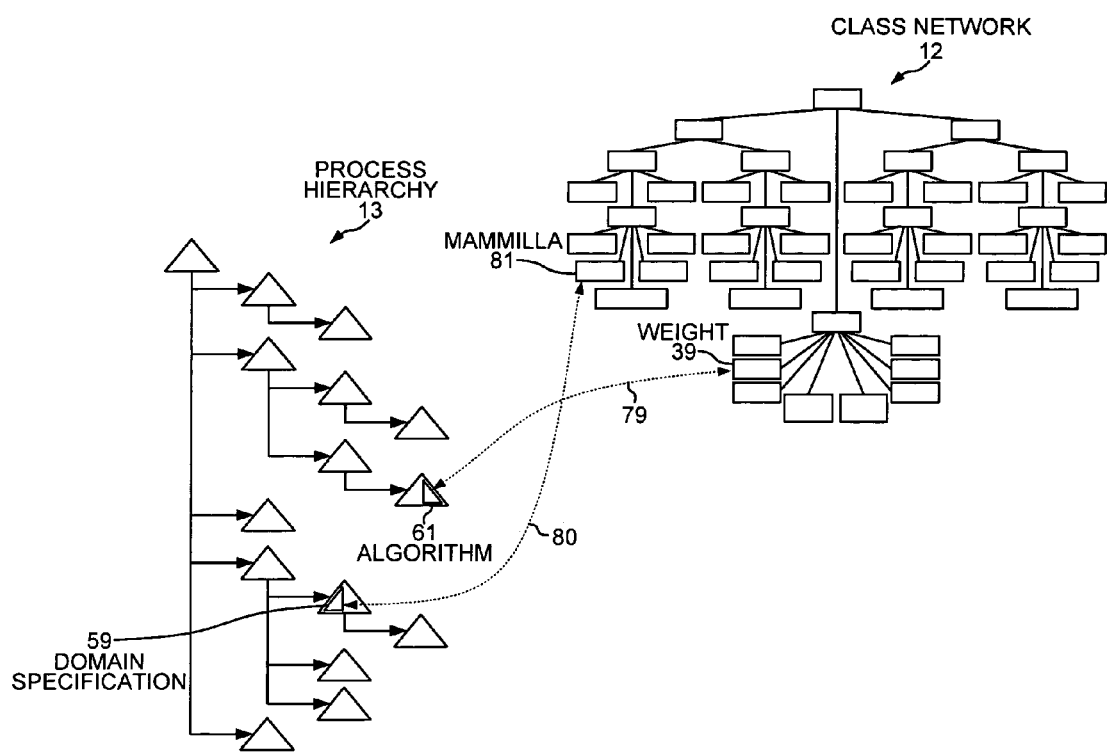
FIG. 10 is a simplified schematic diagram of the computer-implemented network structure of FIG. 1 after the class network and process hierarchy have been specified in the specification mode.

FIG. 10 illustrates the condition of computer-implemented network structure 10 in the specification mode after the user has specified class network 12 in step 32, process hierarchy 13 in step 33, and the link types in step 34. In this example, in the specification mode the user has specified a link 79 between algorithm 61 and subclass 39 (Weight) of class network 12. The user specifies link 79 by specifying that algorithm 61 determines the area of the objects that belong to the class Breast Mass depending on the weight of the patient. In the specification mode, the user has also specified a link 80 between domain specification 59 and a subclass 81 (Mammilla) of class network 12. The user specifies link 80 by specifying that domain 59 includes the objects that are determined in the execution mode to belong to subclass 81.

In step 35 of FIG. 3, the Cognition Program acquires the values of first data table 14 and second data table 15. In this example, the pixel values of the images of FIG. 2 are generated by an imaging device, such as an X-ray mammography device. In other embodiments, the imaging device is a computed tomography (CT), an ultrasound imaging device, or a magnetic resonance imaging (MRI) device. The imaging device includes an image digitizer that converts the X-ray image into a digital image. In other embodiments, physical mammographic x-ray film is sent through a film digitizer to obtain the pixel values of the data tables. In yet other embodiments, the radiological images are produced directly in digital format. The digital pixel values of the data tables indicate the grey levels (brightness) in the space domain of the images of FIG. 2. Metadata values are also acquired in step 35. In this example, some of the metadata is in text format, such as the identity of medication prescribed for the patient. Other metadata, such as the patient's weight, is in the form of a digital number.

In step 36 of FIG. 3, the Cognition Program runs in the execution mode and generates data network 11 by selectively linking table data values to objects according to the class network and the process hierarchy. While the classes of class network 12 describe what the user expects to find in the table data values, the objects reflect what the Cognition Program actually finds in the table data values. At run time in the execution mode, the Cognition Program executes the process steps as specified in process hierarchy 13. Each object is generated by linking to the object pixel values having similar characteristics, such as brightness. Thresholds of brightness of pixels that are associated together can be obtained from a gradient histogram of the pixel values in the digital image. The objects are then linked together into classes according to the membership functions of the classes. Thus, classes are linked to objects at run time. In addition, classes and process steps are linked to table data at run time.

Figure 11:
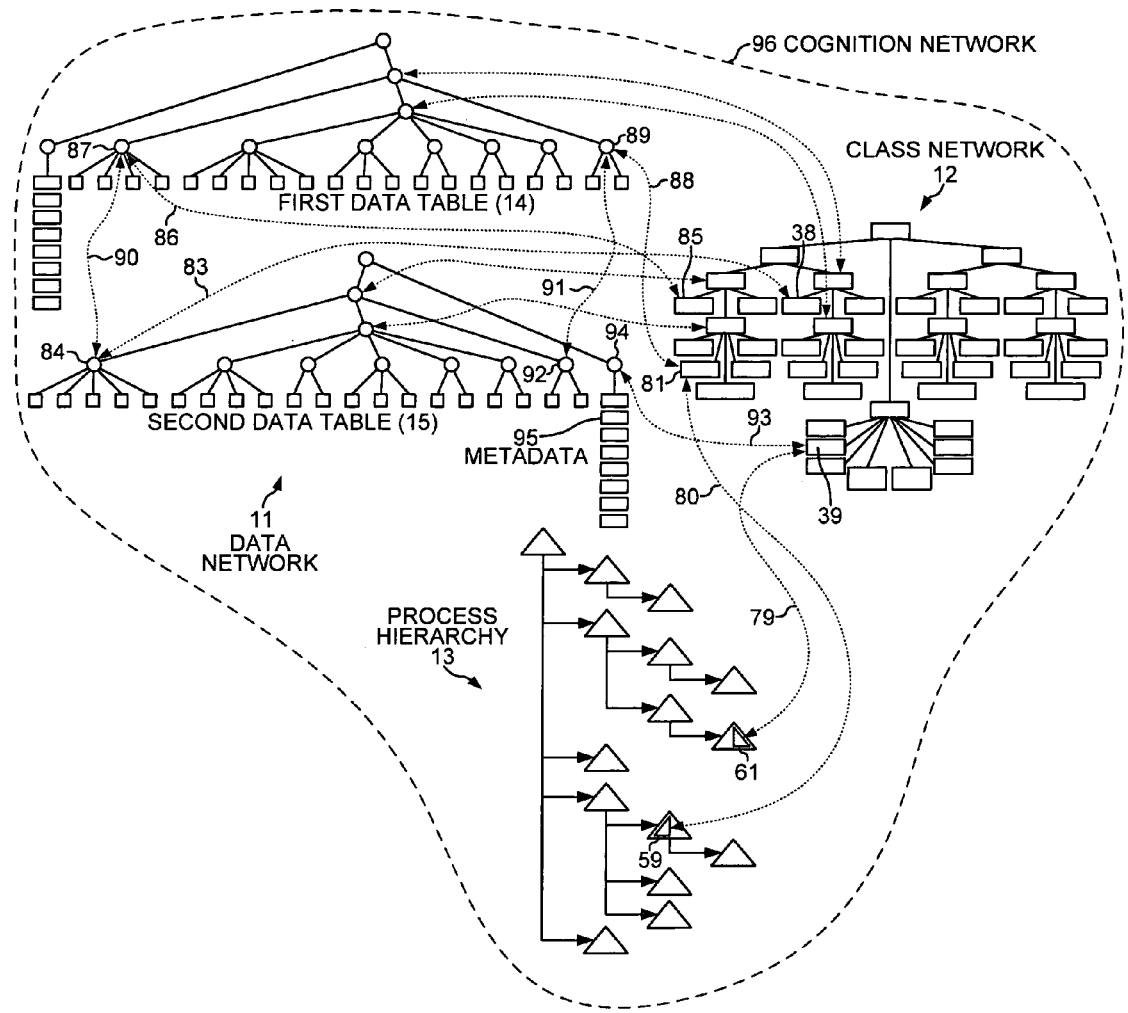
FIG. 11 is a simplified schematic diagram of the computer-implemented network structure of FIG. 1 after the data network has been generated in the execution mode.

FIG. 11 illustrates the condition of computer-implemented network structure 10 in the execution mode after the Cognition Program has generated data network 11. Various classes of class network 12 have been linked to objects in data network 11 that belong to the classes. For example, the class 38 specifying the thorax muscle in left MLO view is linked by a link 83 to an object 84 that links pixel values of the digital image of second data table 15. A class 85 specifying the thorax muscle in left CC view is linked by a link 86 to an object 87 that is linked to pixel values of the digital image of first data table 14. Similarly, subclass 81 (Mammilla) is linked by a link 88 to an object 89 that is linked to pixel values from the left CC view.

In addition, FIG. 11 shows that while the Cognition Program is running, links are also generated between classes, process steps, objects and table data. For example, object 84 representing pixel values showing the thorax muscle in the left MLO view is linked by a link 90 to object 87 representing pixel values showing the same thorax muscle in left CC view. Similarly, object 89 representing pixel values showing the mammilla in the left CC view is linked by a link 91 to an object 92 that is linked to pixel values showing the mammilla in the left MLO view.

Moreover, algorithms are linked to table data values. For example, algorithm 61 is linked by link 79 to class 39 (Weight) in the specification mode. In the execution mode, class 39 is linked by a link 93 to an object 94 for patient metadata. Thereafter in the execution mode, algorithm 61 is linked to an item of metadata 95 that contains a value representing the patient's weight. Network structure 10 is shown in FIG. 11 as a cognition network 96 when links are present between classes, process steps, objects and table data at run time in the execution mode.

Figure 12:
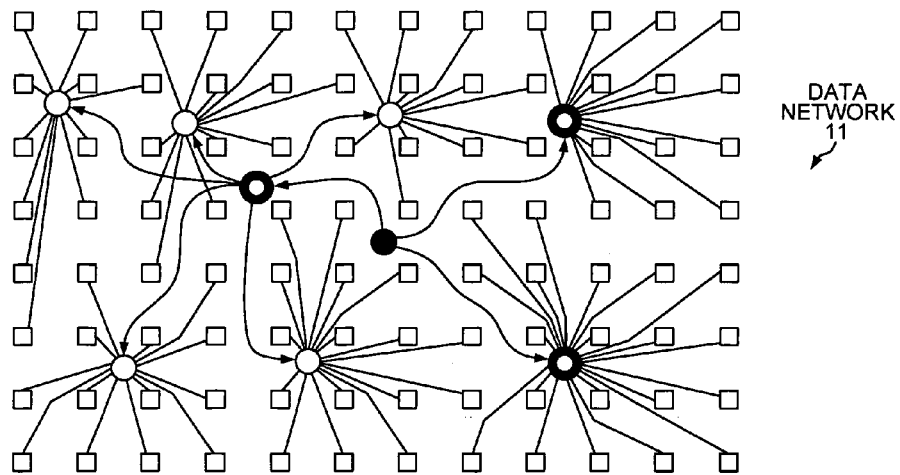
FIG. 12 is a simplified diagram of a data network in which pixel values are linked to objects.

FIG. 12 illustrates objects that have been linked to table data values having similar characteristics. In addition, objects are linked to other objects according to the membership functions that define the classes. The table data values of FIG. 12 are arranged to illustrate that they are pixel values of a digital image. For example, one factor of a membership function is the area occupied by the pixels that make up the object. In one example, the area is calculated as being proportional to the number of pixel values linked to the object.

Figure 13:
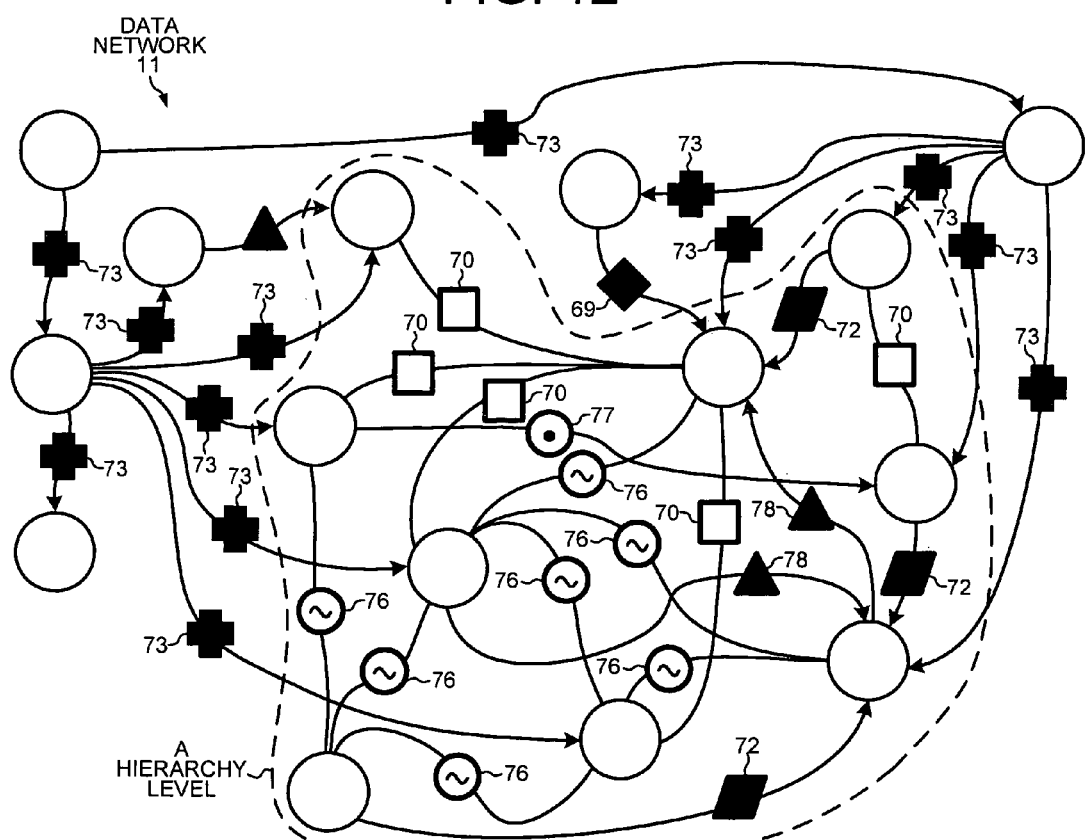
FIG. 13 is a simplified diagram of a data network in which objects are linked to other objects by various types of links.

FIG. 13 illustrates objects linked to other objects in data network 11. The objects are linked by the link types shown in FIG. 9. In the execution mode, an object that belongs to a class is linked to another object that belongs to another class when the two classes are linked together in class network 12.

Figure 14:
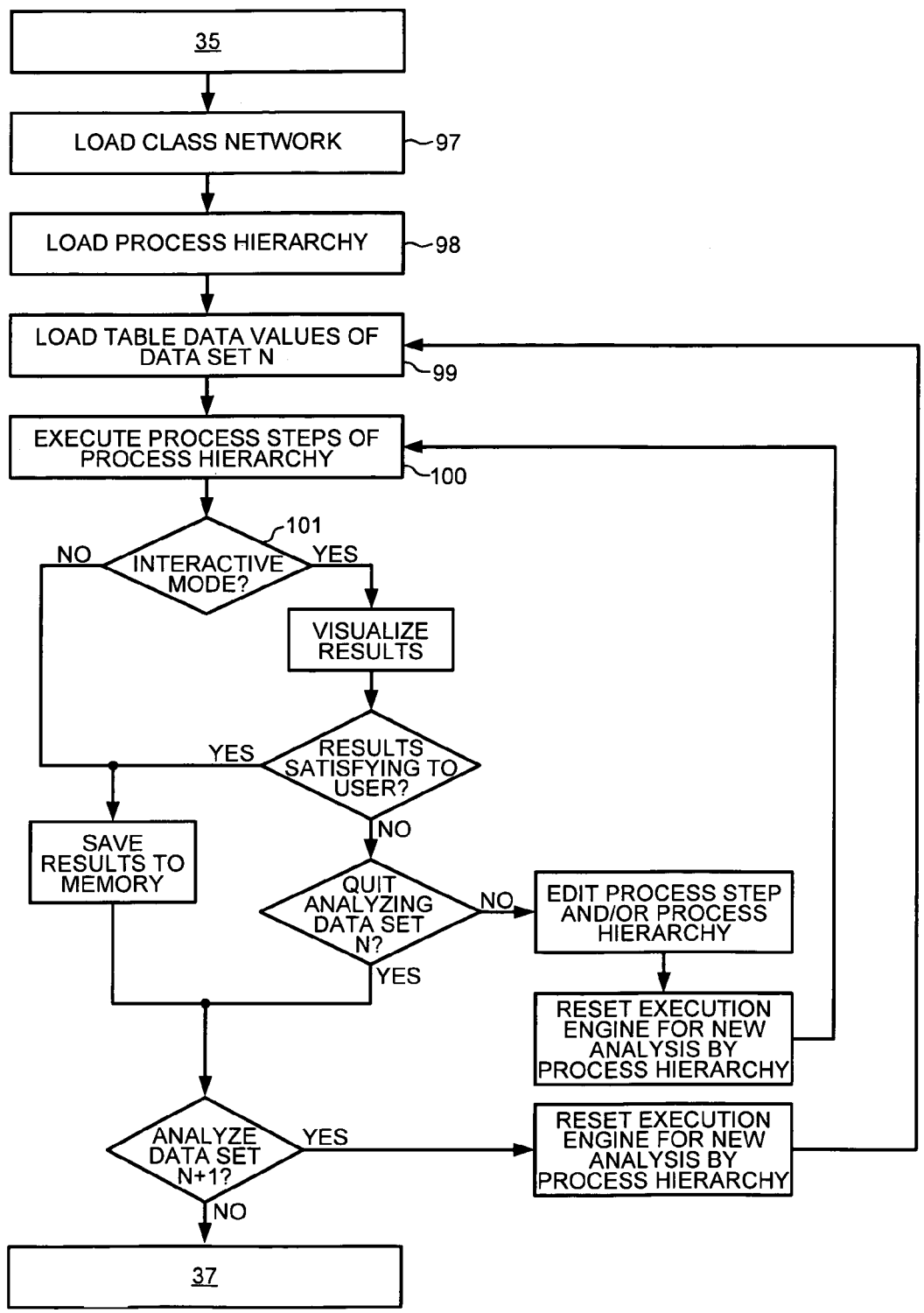
FIG. 14 is a flowchart showing the substeps of the fifth step of FIG. 3 for generating the data network of FIG. 1.

FIG. 14 is a flowchart that illustrates the substeps of step 36 of FIG. 3 in more detail. In a substep 97, the class network that is specified in step 32 of FIG. 3 is loaded into a script execution engine of the Cognition Program. In a substep 98, the process hierarchy that is specified in step 33 of FIG. 3 is loaded into the execution engine. In a substep 99, a data set N of the table data values acquired in step 35 of FIG. 3 is loaded into the execution engine.

In a substep 100 of step 36 of FIG. 3, the process steps specified in step 33 of FIG. 3 are executed on the data set N. In substep 101, the user has the option to run the Cognition Program in an interactive mode. In the interactive mode, the results of the computer-aided detection are displayed to the user, such as a research doctor. If the user is not satisfied with the results, the user can edit the classes of class network 12 or the process steps of process hierarchy 13 and immediately re-execute the process steps on the data set N. The user can edit the process steps using the graphical user interface and the script editor of the Cognition Program.

Figure 15:
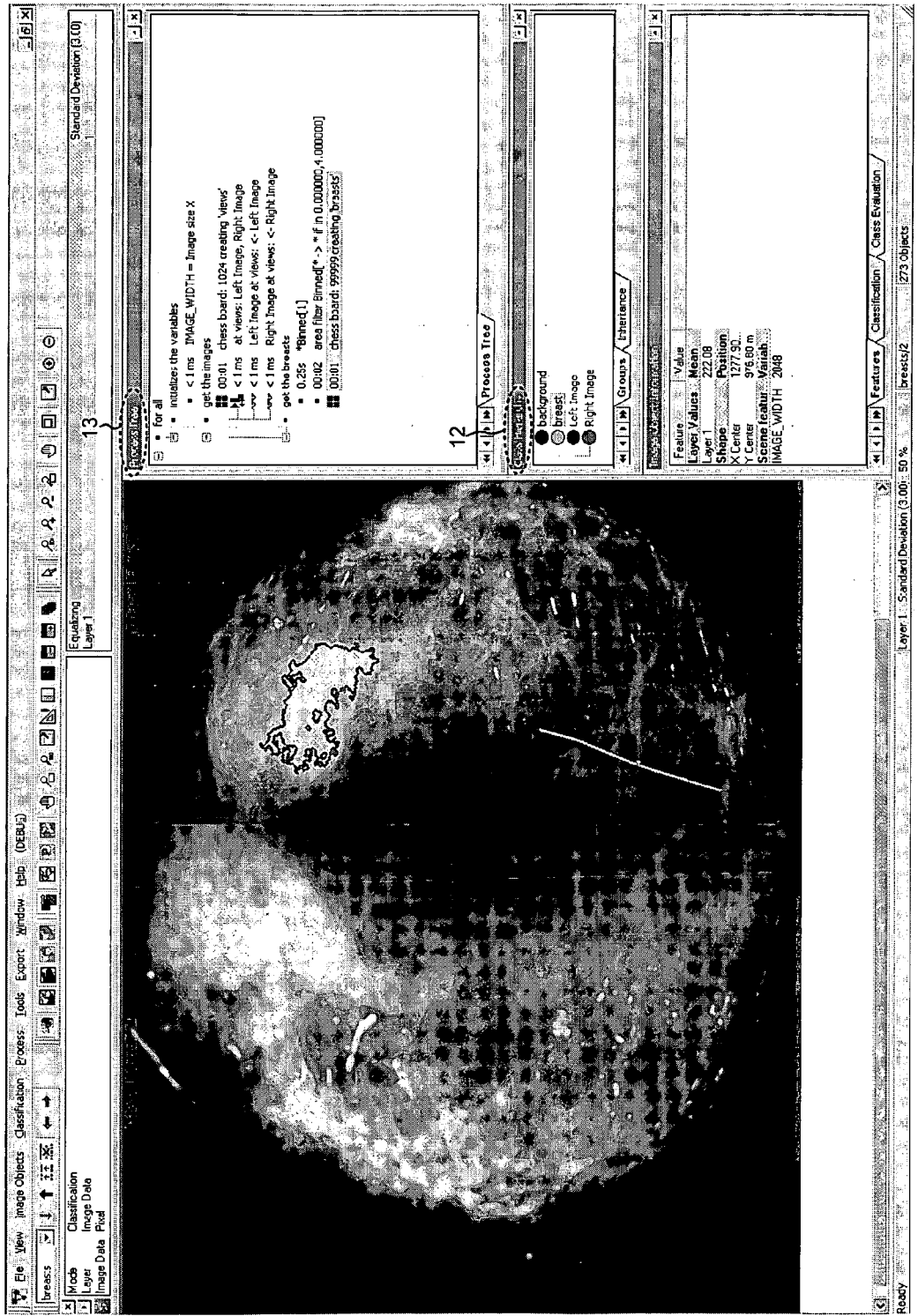
FIG. 15 is a screenshot of a graphical user interface generated by the Cognition Program to assist in the editing of the class network and process hierarchy of FIG. 1.

FIG. 15 is a screenshot of one view of the graphical user interface generated by a view module of the Cognition Program. The screenshot includes a window containing a digital image of the right MLO view of a breast with a target region outlined. The user can edit the class network 12 or the process hierarchy 13 using the windows on the right of the screenshot so that the target region recognized by the particular process step being edited is satisfactory. For example, by right mouse clicking on a process step in the upper right window, a pop-up window appears with a dialogue asking the user whether he wishes to add a sub-process step or append a process step below the clicked process step. The user is then asked to choose a domain and an algorithm for the new process step. Existing process steps can also be edited The user can also add or edit classes using the middle right window. A class is also added by right mouse clicking and responding to the queries in the pop-up window. The user is asked to name the new class and enter properties of objects that belong to the class, such as color, area, asymmetry, density and the angles along the border of the object. Thus, the Cognition Program can also analyze color digital images. For example, the user defines an "asymmetry function" as part of a membership function for objects belonging to a class. The asymmetry function describes the shape of the pixels that make up an object by approximating an ellipse. For example, the user can use the asymmetry function to classify objects that have shapes indicative of micro-calcifications. The numerator of the asymmetry function describes the long axis of the ellipse, and the denominator describes the short axis. A pixel shape that approximates a circle has an asymmetry value of one. An elongated pixel shape has an asymmetry value much greater than one. The user can also define a density function to classify objects that have shapes indicative of micro-calcifications. The density function is the square root of the area of the pixels divided by the length of the border around the pixels that comprise the object.

Because class network 12 and process hierarchy 13 are specified using a Cognition Language (CL) based on the XML script language, class network 12 and process hierarchy 13 can be edited without recompiling the Cognition Program. Thus, the user can input a new membership function of a new class at run time that defines whether the objects of data network 11 will belong to the new class, and the process steps can be performed immediately on the newly generated data network 11 without recompiling the program instructions of the Cognition Program. The XML-based Cognition Language and the graphical user interface allow the user to more quickly "train" cognition network 96 to recognize cancerous mass lesions and micro-calcifications in mammograms or to recognize any other desired pattern. The ability to edit the class network 12 and process hierarchy 13 at run time differentiates the Cognition Program from conventional CAD schemes that cannot change the process of applying rules once the CAD scheme begins analyzing a particular digital image. After the user of the Cognition Program determines that the results of the pattern recognition performed on data set N are satisfactory, the process steps are executed on the next data set N+1.

The Cognition Program would typically not be run in the interactive mode when the user is a clinical doctor who is analyzing a new patient's mammogram instead of a research doctor. A clinical doctor would use the Cognition Program with a class network and a process hierarchy that have already been trained by the research doctor. In that case, all of the process steps of process hierarchy 13 would be executed on all of the data sets, and the results would be saved for displaying as the final results in step 37 of FIG. 3.

Figure 16:
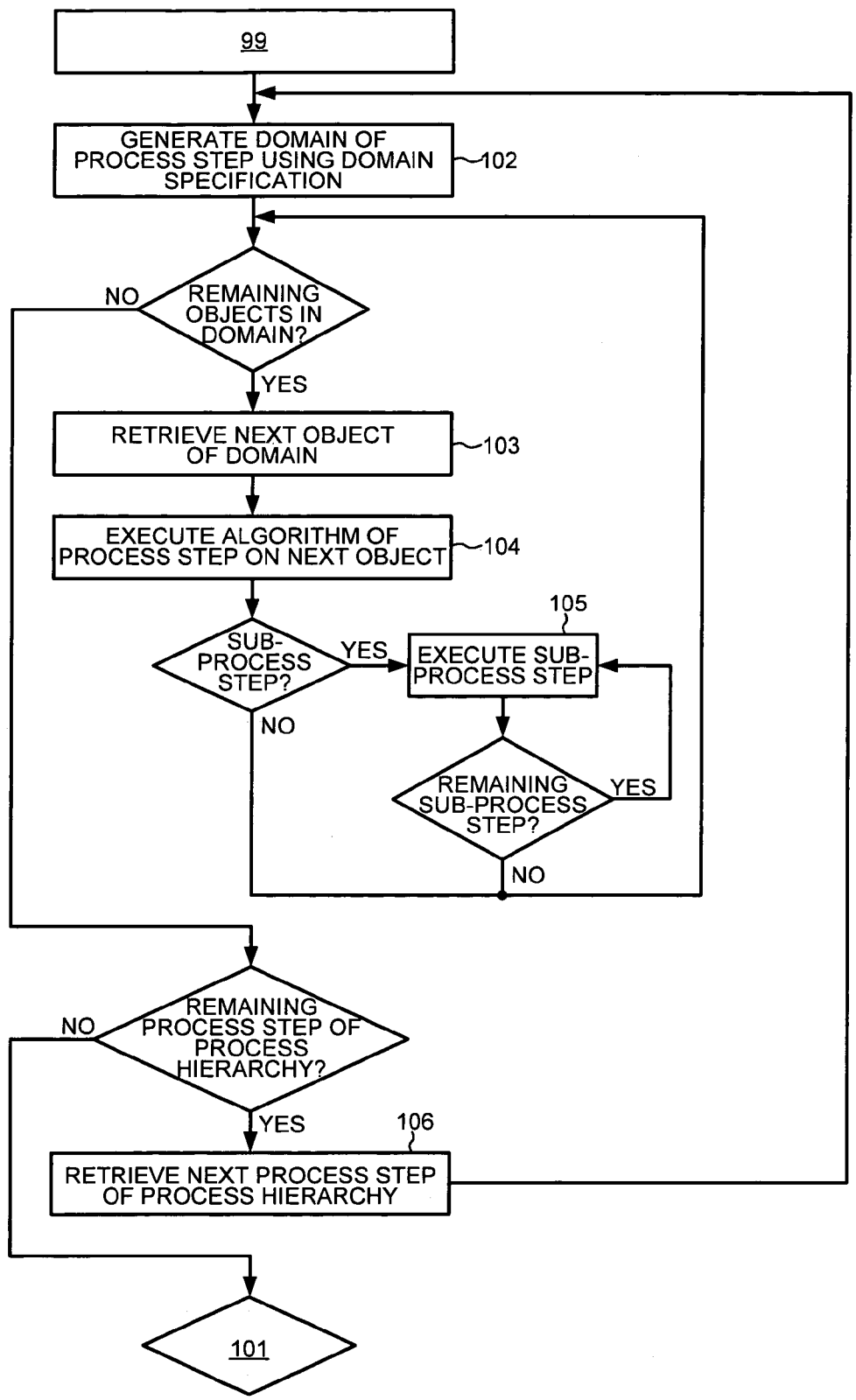
FIG. 16 is a flowchart showing the substeps of a step of FIG. 14 for executing the process steps of the process hierarchy of FIG. 1.

FIG. 16 is a flowchart that illustrates in yet more detail additional substeps of substep 100 of FIG. 14. FIG. 16 illustrates the process by which each process step of process hierarchy 13 operates on objects specified by the domain. In a substep 102, the domain that was specified in substeps 62-65 of FIG. 7 is generated. In a substep 103, the execution engine retrieves the next object of the domain that is to be operated upon. In a substep 104, the execution engine executes the algorithm of the process step on the retrieved object. In a substep 105, the execution engine executes the algorithm of any sub-process steps on the retrieved object. In a substep 106, the execution engine retrieves the next process step of the process hierarchy so that substeps 102-105 can be repeated for the domains and the algorithms of the next process step and sub-process steps, if any.

Figure 17:
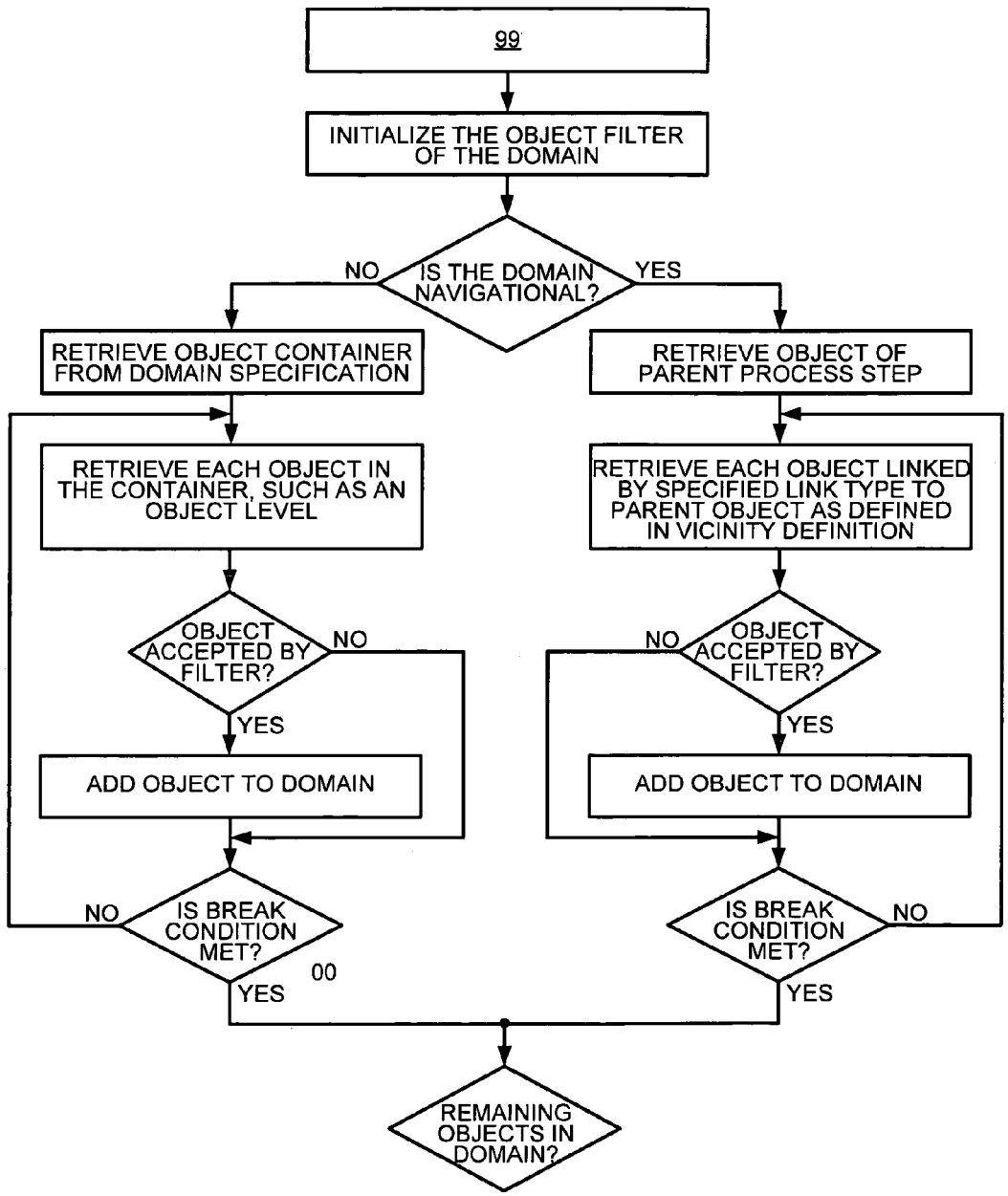
FIG. 17 is a flowchart showing the substeps of a step of FIG. 16 for generating a domain specified in a process step.

FIG. 17 is a flowchart that illustrates in yet more detail additional substeps of substep 102 of FIG. 16. FIG. 17 illustrates the process by which the domain that was specified in substeps 62-65 of FIG. 7 is generated at run time.

In step 37 of FIG. 3, the Cognition Program outputs the final results of the computer-aided detection based on the cognition network 96 that was generated using class network 12 and process hierarchy 13.

Figure 18:
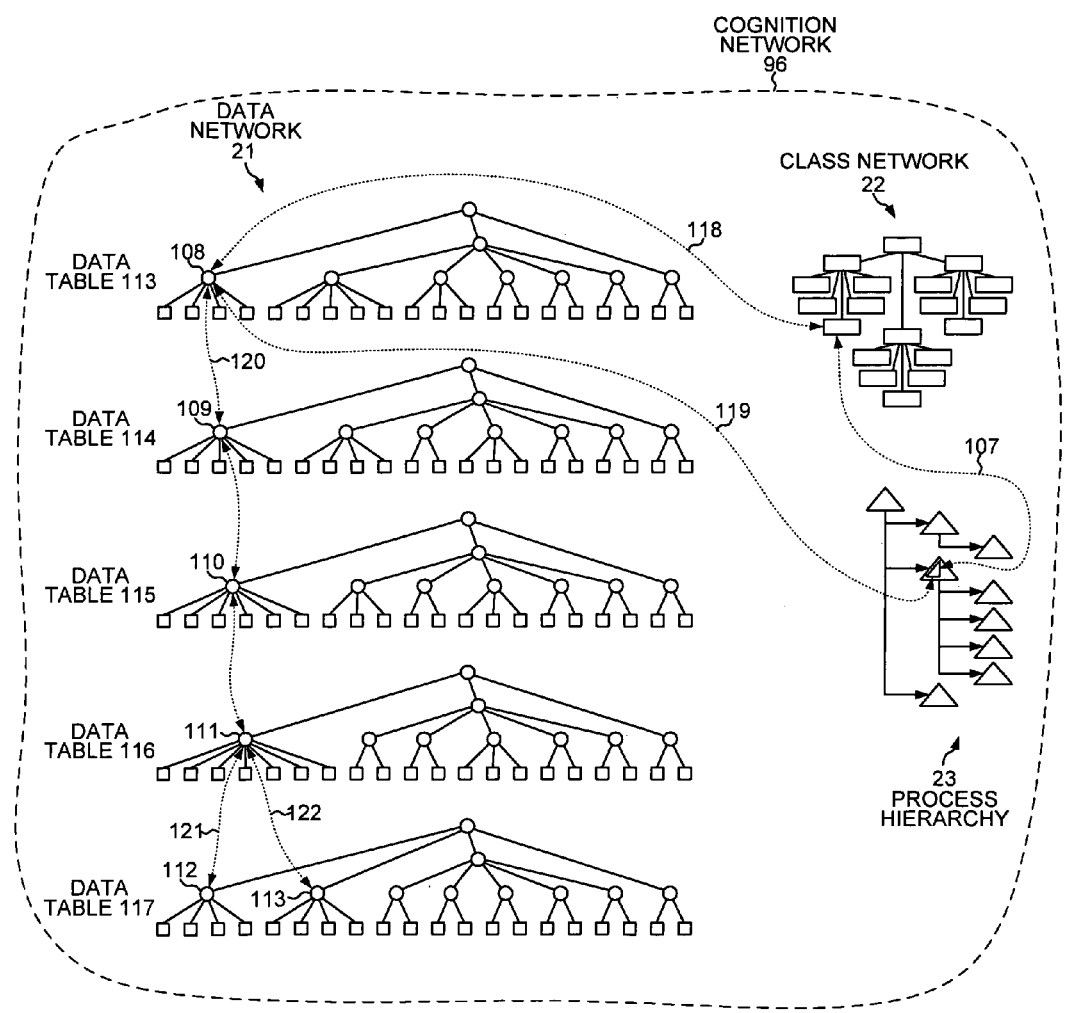
FIG. 18 is a simplified schematic diagram of a cognition network when the data network has been generated from many digital images, such as from many slices of a 3-dimensional object.

FIG. 18 shows cognition network 96 of FIG. 11 when data network 11 has been generated from many data tables, each containing a digital image. By generating data network 11 from digital images obtained from many parallel planar slices of a three-dimensional data set of a physical object, the Cognition Program detects three-dimensional target regions in the physical object. For example, the slices are extracted from a three-dimensional data set of a human breast, and the 3-dimensional target region is a cancerous mass lesion. In another embodiment, parallel planar scans are taken of a human brain, and the 3-dimensional target region is the medulla or ventricle of the brain.

FIG. 18 illustrates that in the specification mode a domain specification is linked by a link 107 to a class. In the execution mode, the Cognition Program acquires table data values comprising the many digital images that are slices of a three-dimensional data set. The Cognition Program then applies the membership function of the class to the values of each of the digital images and determines that various objects generated from the many digital images belong to the class. For example, the Cognition Program determines that each of objects 108-112 from digital images in data tables 113-117, respectively, belongs to the class. The class is then linked to each of the objects 108-112. For example, a link 118 links the class to object 108, which in turn is linked to pixel values from a first digital image in data table 113. At run time, the domain specification is then also linked to the objects that belong on the class specified in the domain specification. For example, a link 119 links the domain specification to the object 108 while the Cognition Program is running. This allows the algorithm of the process step to operate on all of the objects that comprise the 3-dimensional object. Finally, each of the objects 108-112 that are generated from the many digital images and that belong to the class are linked to each other in data network 11. For example, object 108, which is linked to pixel values from the first digital image, is linked by a link 120 to object 109, which is linked to pixel values from the second digital image.

Figure 19:
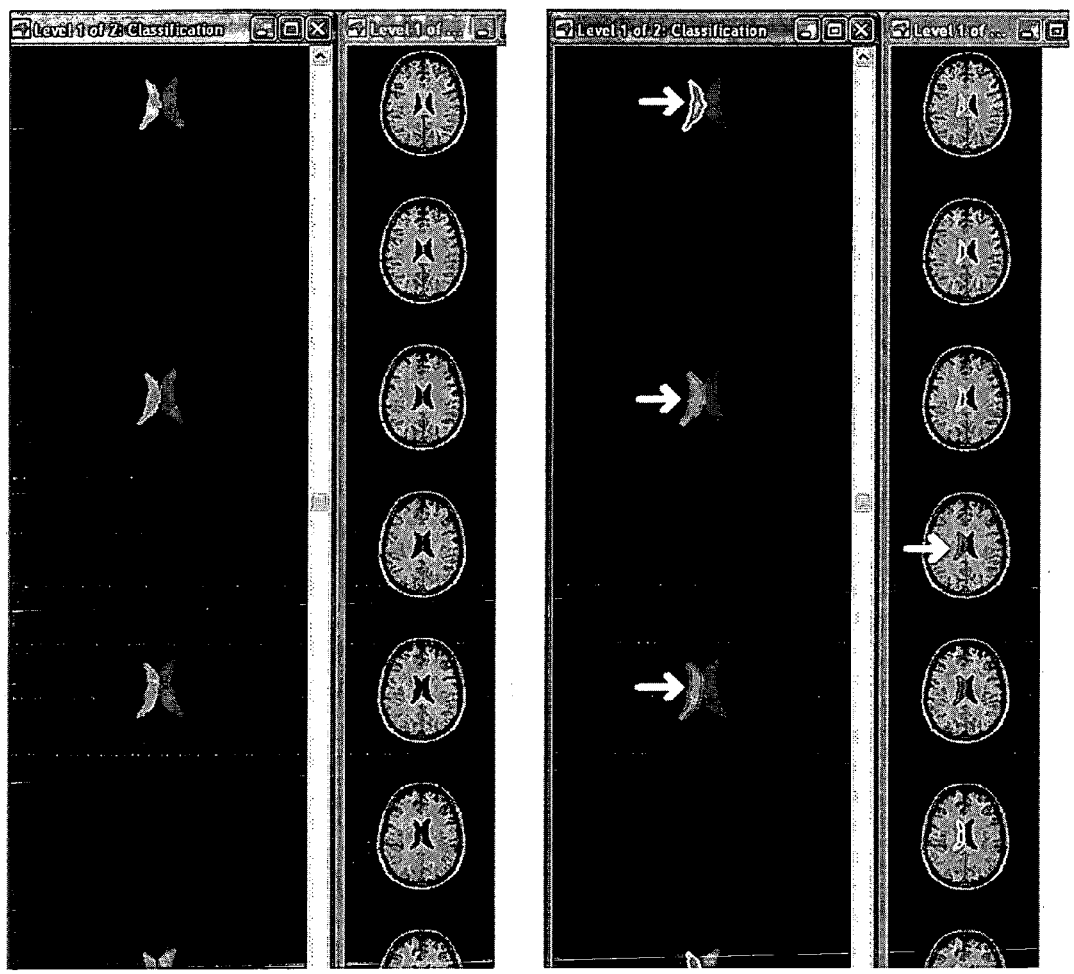
FIG. 19 is a screenshot showing images of parallel planar scans of a human brain.

FIG. 19 shows images of parallel planar scans of a human brain. The Cognition Program has detected a 3-dimensional object (a portion of a ventricle or of the medulla oblongata) by linking objects in adjacent scans that belong to the same class. The objects in adjacent scans that belong to the same class are displayed with the same color in the output of step 37 of FIG. 3.

Returning to FIG. 18, the Cognition Program has linked an object generated from one parallel planar slice to two objects in an adjacent parallel planar slice. Object 111 that is generated from the fourth digital image is linked to two objects of the same class generated from the fifth digital image. Object 111 is linked by a link 121 to object 112 and by a link 122 to a second object 113 generated from the fifth digital image. In this way, the Cognition Program is able to detect 3-dimensional objects such as blood vessels that fork into multiple portions in adjacent slices.

Linking objects in multiple scans can also be used to track movement over time. Instead of the scans representing adjacent physical planes of an object, multiples scans are analyzed that are acquired at different times. For example, the objects 108-112 and 113 belong to the class representing a cell. Digital images are taken of the cell at different time intervals. Movement can be tracked by linking objects of the same class that are obtained from digital images taken in adjacent time intervals. Over the four time intervals at which the digital images of data tables 113-116 are taken, the cell described by the class linked to objects 108-111 grows from four pixels to seven pixels. Then after the fifth time interval, the cell divides into object 112 with four pixels and object 113 with four pixels.

In another embodiment, the Cognition Program acquires the multiple digital images from a video movie instead of from multiple scans. The video movie depicts movement of an animal or a vehicle, such as a worm, a fish, a bacterium, a cell, a person, a motor vehicle, a boat, or an airplane. The Cognition Program can be used to detect a moving animal or vehicle from among multiple moving objects. For example, the Cognition Program can be used to detect and follow a specific car as that car moves in traffic in a video movie.

FIG. 20 is a screenshot of the final output results of step 37 of FIG. 3 in yet another embodiment of the Cognition Program. In the embodiment of FIG. 20, cognition network 96 has been generated using four digital image views of mammograms from hundreds of patients. Objects in different mammograms that belong to the same class are linked. In addition, similar characteristics of the metadata of patient information are also linked. In this way, the mammogram of a new patient can be compared with the most similar mammogram of a prior patient whose diagnosis was known to be valid. In this application, the Cognition Program acts as a "Cognition Integrator" by integrating four digital image views as well as patient information from each of hundreds of patients into one cognition network.

Figure 21:
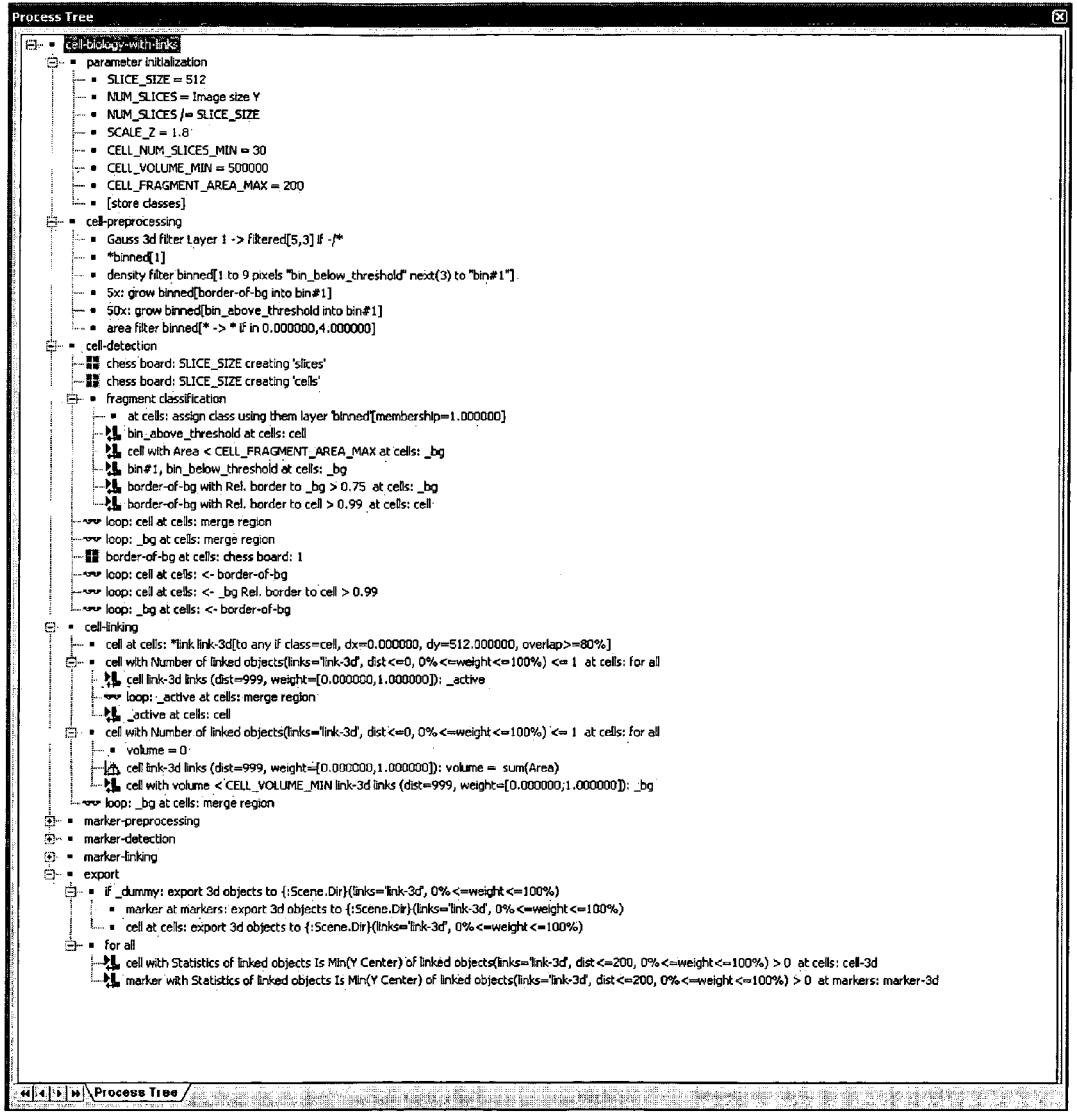
FIG. 21 is a screenshot of a process hierarchy used by another embodiment of the computer-implemented network structure of FIG. 1 to analyze individual cells in a cell assay.

FIG. 21 is a screenshot of a process hierarchy in another embodiment of cognition network 96 that analyzes individual cells in a cell assay. Three-dimensional properties of the cells are analyzed using one hundred scans at different depths of an individual cell using a confocal microscope. During the "training" process when the Cognition Program is run in the interactive mode as described by the substeps of FIG. 14, the process hierarchy of FIG. 21 is presented to the user in the upper right window of FIG. 15.

Figure 22:
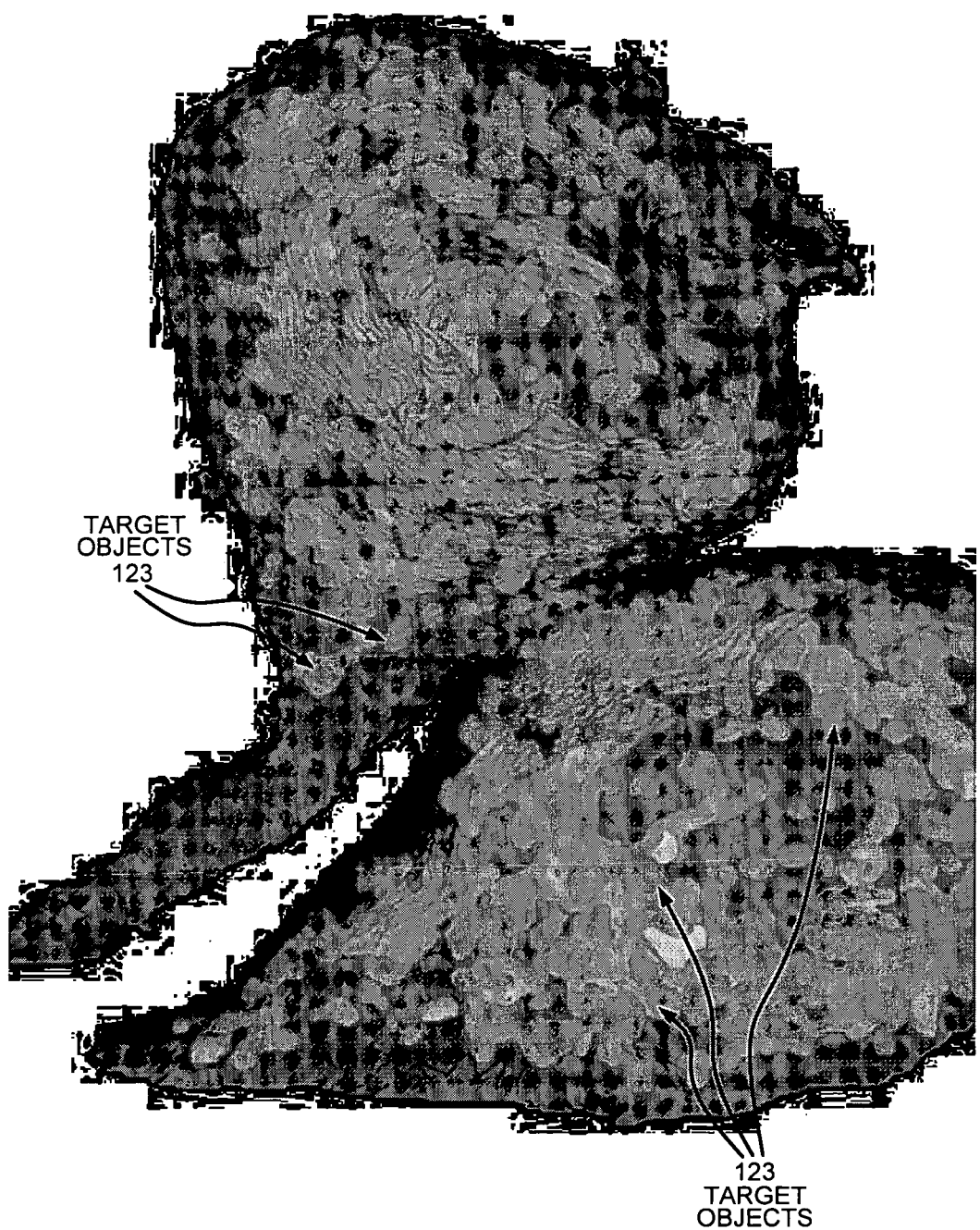
FIG. 22 is a 3-dimensional diagram of a dividing cell output in the last step of FIG. 3 with marked target objects.

FIG. 22 shows the output of step 37 of FIG. 3 as presented to the user on the graphical user interface for the embodiment of FIG. 21. A 3-dimensional dividing cell from a cell assay is depicted in FIG. 22. In the image of FIG. 22, target objects 123 that belong to the same class are displayed with the same color. In this example, target objects 123 are marked proteins. The Cognition Program compared the mean volume of the marked proteins to the volume of surrounding cytoplasm.

In yet another embodiment, cognition network 96 analyzes cells that are aggregated in tissue. Table data values are acquired in step 35 of FIG. 3 from images of cell tissue in multiple wells of a tissue micro array. The Cognition Program is used to look for morphological changes in the cells. The Cognition Program is used to detect motion in the cell tissue by analyzing multiple images taken of the same well after successive time intervals. The Cognition Program determines how long it takes for the cells of the tissue to stop dividing when a specified dosage of a drug is placed in the well.

Figure 23:
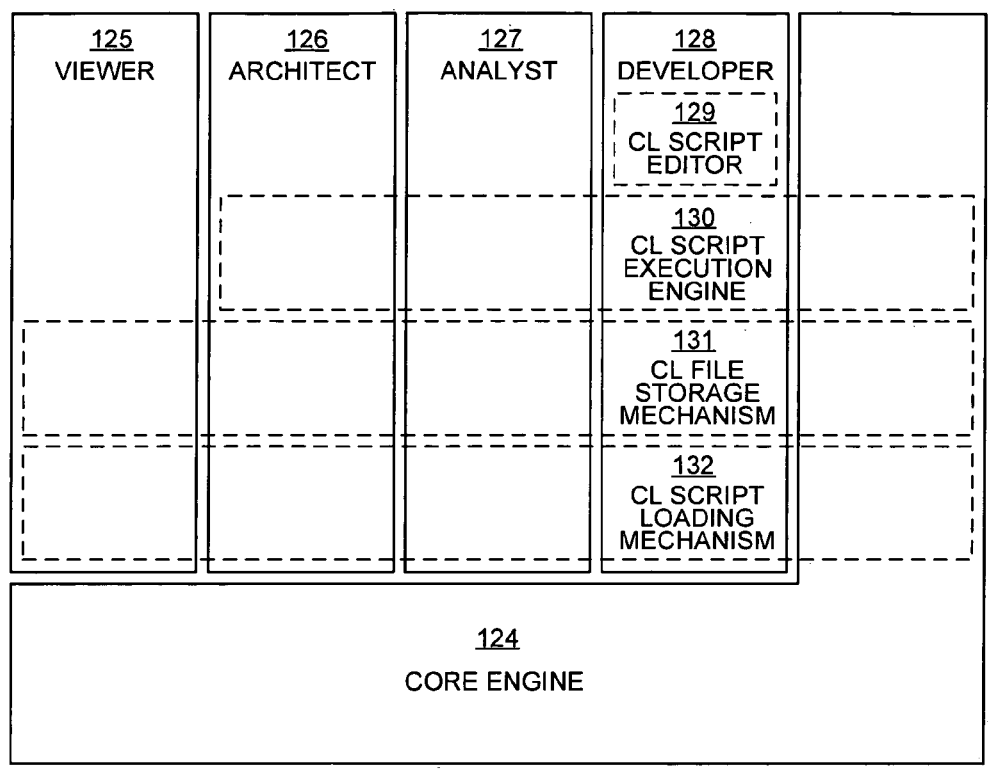
FIG. 23 is a diagram of the structure of the modules and script functionalities of the Cognition Program.

FIG. 23 is a diagram of the structure of the Cognition Program. In one embodiment, the Cognition Program consists of five modules: a core engine 124, a viewer module 125, an architect module 126, an analyst module 127, and a developer module 128. Each of the five modules is written in the programming language C++. Viewer module 125, architect module 126, analyst module 127 and developer module 128 all run on core engine 124. Architect module 126 is used to enter the required parameters requested by pre-specified class networks and process hierarchies. Then cognition networks are generated by executing the pre-specified class networks and process hierarchies on analyst module 127. Analyst module 127 analyzes data sets using the class networks and process hierarchies generated using architect module 126. Developer module 128 incorporates all of the functionality of architect module 126 and analyst module 127.

A user may create his own scripts in a novel Cognition Language (CL) by specifying a class network and a process hierarchy using a CL script editor 129 in developer module 128. CL script editor 129 presents a visual representation of the Cognition Language and allows the user to create and modify CL scripts using standard Microsoft Windows, user-interface elements, such as drag and drop, tree controls, and list boxes etc. Although developer module 128 executes the CL scripts that specify the class network and process hierarchy, the CL scripts are stored only as XML code. The CL scripts are stored in C++ data structures in memory of the computer that implements computer-implemented network structure 10.

A CL script execution engine 130 is present in developer module 128, core engine 124, architect module 126 and analyst module 127. At run time, CL script execution engine 130 translates CL scripts into a series of C++ function calls and then executes the calls. Thus, execution engine 130 interprets the CL scripts at run time. After a CL script has been executed, a CL file storage mechanism 131 translates the CL data structures to XML and saves the XML code to a file or database. Before the Cognition Program can run a CL script, a CL script loading mechanism 132 recreates the CL data structures from the stored XML files. Both the storage mechanism 131 and the loading mechanism 132 are present in all of core engine 124, viewer module 125, architect module 126, analyst module 127, and developer module 128.

FIG. 24 is a listing of high-level lines of XML code that corresponds to a CL script that implements a class network and a process hierarchy for analyzing mammograms. The CL script was created and edited using a graphical user interface similar to the one shown in FIG. 15. All of the lines of the XML code are present in an XML file entitled mamma-v002.dcp.xml and contained in the CD Appendix.

FIGS. 25A-E show more lines of the XML code of FIG. 24. The XML description of selected classes of FIG. 4 and process steps of FIG. 6 are identified by XML comments in FIGS. 25A-E. For example, FIG. 25B shows an XML description 133 of the class Mammilla 81 of FIG. 4. The class "Mammilla" is identified with the class ID of "15". In addition, FIG. 25B shows an XML description 134 of a Helper class of FIG. 4. The Helper class is a temporary class and generates intermediate objects at run time. The intermediate objects are reclassified as the Cognition Program iteratively performs the process steps to optimize the categorization of objects into the remainder of the specified classes. Thus, performing the process steps of the process hierarchy is an adaptive process that is repeated and optimized on same digital image.

FIG. 25D shows an XML description 135 of the domain specification of a sub-process step of the sub-process step 55 (Link Mammillae) of FIG. 6. The class ID "15" for the class "Mammilla" is listed under the list of classes <lClss> of the domain specification. The class ID in the domain specification generates a link between the domain specification and the class at run time. At run time, links are also generated from the domain specification of the sub-process step to the actual objects of the data network that are determined to belong to the class "Mammilla".

Figure 26:
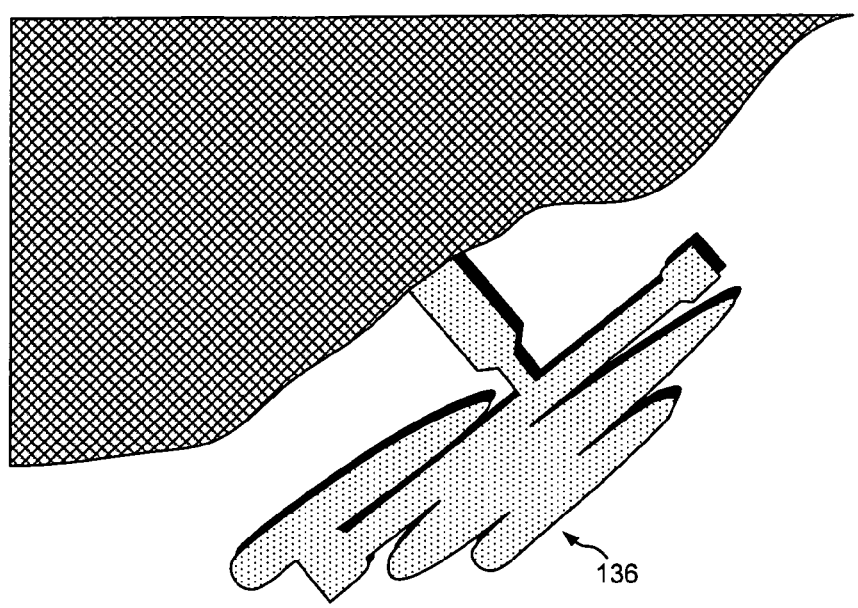
FIG. 26 is a representation of a satellite image from which the Cognition Program generates a cognition network in order to detect ships in a harbor.

FIG. 26 shows a digital image from which the Cognition Program generates a cognition network in order to detect target objects in another application. FIG. 26 is a satellite image of a harbor in which various ships are anchored. The table data values acquired in step 35 of FIG. 3 also include metadata relating to the ships. For example, the metadata includes the names of ships and their sizes, the shapes of their bows and sterns, and the distances between their bows and sterns.

The shape that is being analyzed does not show discrete ships. Each ship may not appear as a discrete object because the satellite taking the image is not directly over the harbor.

Shadows from the sun also merge the outlines of the ships. Therefore, the ships and the harbor platform appear as a single form. In the execution mode, the single form is broken apart and categorized into objects that belong to helper classes. Then the objects are merged together and categorized into other objects that belong to classes that relate to ship characteristics. For example, there is a class that corresponds to the stern shape of a particular ship. Finally, the objects are merged together and categorized into parent objects that belong to classes that correspond to individual ships.

In other embodiments, a cognition network generated by the Cognition Program is used to detect other military images, such as tanks, missile launchers, and airplanes. In addition, the Cognition Program can be used to detect roads, buildings and rivers for making maps. The digital images used as the input data can be taken from airborne sensors, such as cameras in airplanes or in balloons.

Automated electronic data processing has existed since there have been computers. The more complex the tasks have become, the more challenging the computer programs have become and the greater the demands are for the programmers to produce programs that run without errors. To allow the programmer to devise increasingly complex programs at all, more and more powerful computer languages had to be developed. One line of code in Java, a modern programming language, for example, is substantially more powerful than one line in machine language.

In spite of the breakneck speed of the development of programming languages, today even simple intelligent tasks can still not be performed by computers if the complexity of the task exceeds a certain mass. In fact, this critical mass is rather modest, compared to the complexity that the human mind can handle. If the relationships are simple but the data set is large, the computer is indeed superior to humans. If the relationships are complex, however, the computer generally fails at a very low level.

Complex relationships exist above all in cases where the information is formulated primarily implicitly, that is where the information can be evaluated correctly only with the help of complex knowledge. Examples of such implicit information are complex tables, text, graphs, images, films or other data types. All these cases require knowledge or even expert knowledge to allow a correct interpretation of the contents. The images on our retina and also the digital images of a camera are in the form of pixel fields. The meaningful objects in the images, which are what makes the images interesting in the first place, do not exist a priori in the images. Rather, they form only after interpretation in our brain. This process is called interpretation or cognition.

Consequently, it is desirable to produce a computer-implemented method for the automated knowledge-based production of user-relevant data, by means of which implicit information can be extracted efficiently from heterogeneous data by interpretation. Such a computer-implemented method permits (i) auto-programming and training, (ii) the automated segmentation, analysis and interpretation of complex multi-dimensional images and the possibility of a meaningful visualization of the contents of multi-dimensional images, (iii) the automated interpretation of complex table contents with automated segmentation and grouping of the contents and thus the recognition of important relationships, (iv) the automated interpretation, analysis, and indexing of complex text documents, (v) the preparation of highly complex "business intelligence" software, and (vi) the automated meaning-driven intelligence data integration and analysis of multimodal heterogeneous data (a holistic interpretation of data).

A network structure is disclosed that permits the automatic interpretation of contents in complex data by means of a computer-implemented procedure. The computer-implemented network structure enables the automatic interpretation of tables, images, texts and networks. Also disclosed is a software tool that allows the preparation of complex interpretations. A novel computer language is described for the interpretation of complex contents in data, such as tables and other structures. The internal structure of the novel computer language is based in principle on the properties of the human thought structure.

The correct interpretation of contents in data presupposes knowledge. In conventional computer programs, this knowledge is introduced implicitly by the programmer into the program in the form of algorithms. The problem with this conventional approach is that the knowledge may be distributed over the entire program, and, as a rule, it cannot be clearly located in the program. In conventional computer programs, knowledge and processes are interwoven. In very complex programs, it has become almost impossible to untangle the two at a later time. As a result, modifications of the program become difficult or entirely impossible. However, in the case of complex relationships, a perfectly running program can in fact not be achieved, and it is desirable continuously to improve the programs over weeks, months, years, and even decades. The greatest problem here is so-called transferability. Even if the problem-free running of a program has been successfully tested using a large number of data sets, problems that have not yet been addressed almost always occur with new data sets. This situation has to do with the immense number of different situations in complex relationships.

At the beginning of the existence of computers, software and hardware were also interwoven. Being able to separate the two was a great achievement, as it allowed both to be improved independently of each other. The Cognition Language analogously allows challenging and complex programs to be written, while dealing separately with the knowledge and the processes in a simple and convenient manner.

Today, neural and semantic networks represent a known method that claims to work in that direction. The knowledge is represented by the structure of the semantic network, and a computer program uses this knowledge to process the data structure. However, semantic networks should not be considered to be higher computer languages. Rather, they are simulation tools with very limited application possibilities. A computer language, even if it is unable to process all the solution with optimal elegance, should at least be capable of solving, in principle, any problem. New processes in semantic networks have to be written in a conventional computer language. In the Cognition Language (CL), several fundamental processes are predefined and implemented in a conventional computer language. However, these processes are so generic that new processes can be prepared from these generic building blocks. It is only for the purpose of continuing to improve the ease and elegance of the program writing that new generic CL building blocks, which are written in a conventional language, also continue to be added. Several other aspects, such as the concepts of domains and of navigation by subsets, are also lacking from neural and semantic networks.

The Cognition Language possesses the following properties, which enable CL to solve high-level tasks. CL is a subject-specific "high-level" language. CL is modular; CL modules (CL objects) are combined to form a program. There are input objects and CL objects. More specific CL objects are knowledge objects and flow objects. More specific input objects are input data and objects generated therefrom.

Knowledge objects and flow objects can be combined into knowledge, hierarchies and flow hierarchies. Finally, the possibility of linking all the objects leads to a hierarchical network—the finished program.

The Cognition Program transforms weakly structured input data into a hierarchical network of relevant input objects. This transformation occurs via a large number of intermediate steps, in which intermediate objects, which in the end are not relevant, are generated. These intermediate objects gradually develop into relevant intermediate objects. Fundamental, general and subject-specific, knowledge is incorporated fixedly in the language. Fundamental knowledge characterizes the structure of the CL language, and the specific knowledge characterizes the special, concrete, predefined building blocks (the base modules or CL objects). Any number of CL objects can be chosen, individually given parameters and variables, and assembled by hierarchical linking into a complete program. The program flow and the results can be visualized, and thus their quality can be checked.

The CL language is structured as follows. Application-based "world knowledge" (WK) and program flows can be formulated separately. The WK and the flows can be constructed as hierarchical network structures from knowledge objects or from flow objects. Together, the WK hierarchy and the flow hierarchy constitute the program. Subsets of all the shapes of objects (domains) can be selected directly or indirectly, either manually or by means of processes. Domains are used for the local execution of processes and other algorithms. Domains can be a part of a program flow or a part of a knowledge object. An indirect selection occurs by a sequential, hierarchical selection by navigation along partially predefined or selected links. Domains can be transformed by means of processes or manually into objects by segmentation of the input, the knowledge, and the flows. Such objects are objects with higher hierarchical rank. Processes can be applied locally to domains. Flows and WK can intervene mutually on each other and modify each other mutually. Relations between partial regions of WK in the flows, as well as in the data, can be formulated and computed automatically.

The WK consists of knowledge objects, such as concepts (classes), linking concepts, concept links, labels, object descriptions (expressions), and local and global variables. The flow hierarchy (or process hierarchy) consists of computations, conditions, different types of classification and segmentation processes (the processes) and object property computations (features), as well as of a formula editor for features and variables. All objects can be linked to each other manually or by processes. Different data sets can be loaded and they themselves or their components can be linked to each other by processes. Different analysis results can be loaded, and they themselves or their components can be linked to each other by processes. Different knowledge hierarchies can be loaded, and they themselves or their components can be linked to each other. A linked, simultaneous analysis and interpretation of different or heterogeneous tables and other types of data, such as, texts, numbers, vectors, spectra, images and presentation documents, can be preformed.

All objects and links can be deleted by processes or manually. The linking of input objects with knowledge objects corresponds to a classification; the linking with a label corresponds to a labeling; and the linking with a local variable corresponds to an attribute assignment. Not only input objects, but also knowledge objects and flow objects, can be classified. The results can be exported in the form of hierarchical object networks or in the form of tables and diagrams. Tables, partial sets thereof and other data objects can be generated and deleted, or modified. For example, a new column can be added, and columns can be multiplied with each other.

Subsets of a table can be inserted via processes into other tables. Repeated program flows (loops in process steps) can be formulated. Sub-process steps can be formulated. A flow can, as a function of a condition, interrupt a loop and proceed to other flows in any position in the process hierarchy. General data, particularly names and contents of concepts and more specifically also names and contents of rows or columns of table data, can be extracted from knowledge objects via variables and inserted or used in other concepts or in flows. The names of the rows or columns of tables can be extracted via variables, and inserted and used in concepts or flows or other tables. Linked objects can be considered hierarchically higher-ranked objects that possess properties and that in turn can be linked to form hierarchically higher objects.

The Cognition Program allows the process hierarchy (program flow) as well as the results to be visualized. All structure elements can be represented graphically. The flow of the problems can be represented because it is possible to represent the evolution of the knowledge or data object. The representation of the objects can occur in the form of (transparent) coloring, which corresponds to their classification, their label or the value of a feature or an attribute. The contour of the object and its position can also be represented. The similarity of objects or another form of their membership can be represented, for example, by identical coloring.

Complex data, particularly tables, images and texts, can be analyzed and interpreted automatically using CL. CL has a structure that provides support, and makes possible in the first place, the preparation of highly complex solutions from the cognition area. In contrast to conventional methods, an evolution of objects up to a hierarchical network structure of these objects is generated automatically and stepwise from the data sets. In the process, this object structure consists only partially of predefined data blocks of the data. By taking into account abstract knowledge, the objects are rather generated based on sense criteria and not on formal criteria. As a result, it becomes possible automatically to extract sense and meaning from the data sets, such as, for example, tables. CL allows the rapid and convenient preparation of such programs with the help of the described structure elements, which are adjusted to each other.

The automatic analyses can be used by the user as a complement to his own interpretation, to help in the decision making process. The user can drastically reduce the time required for an analysis and considerably increase its quality. The table and other data here can contain heterogeneous contents, so that very different types of information for an overall evaluation can be contributed automatically to an overall interpretation.

The special structure of CL allows the automatic processing of the data. CL has three essential components: (i) the input data plus the input objects generated therefrom, (ii) the program control, and (iii) abstract and concrete knowledge about data contents, program control and knowledge. It may seem curious that a program contains knowledge about itself. However, it is only in this manner that intelligent performances similar to those of a human become possible in the first place.

The input data themselves are part of the input data, as are the objects generated procedurally from them and their links to each other. The program control represents and describes the dynamics of the program, which, once started, performs computations and structure modifications. In the simplest case, the program control structures the input data into a new form, using the abstract knowledge. In the process, subsets of the input data are determined, defined as objects with properties, and linked both to each other and also to the knowledge. In many cases, the objects are also provided with attributes by the program control.

In the general case, on the other hand, during the flow of the program control, not only the input data, but also the knowledge and the program control itself are restructured. That is, overall the program structure modifies itself as a function of input. The modification of the entire program structure becomes necessary precisely when all three components, knowledge, data and program control, have to adapt to each other to guarantee a sensible program flow. This circumstance exists, for example, when new knowledge and new processes have to be generated automatically from the data, that is when it is impossible to predefine every possible situation in the input data in the form of a concrete program structure and knowledge structure. Instead, they are first generated via program control steps. In this manner, (i) a program can be adjusted even more flexibly to input data, and (ii) a self optimizing program (knowledge plus program control) can thus be prepared that optimizes itself only on the basis of a training data set, and that is then set fixedly in this optimized form and allowed to run with other new data sets.

A novel programming language allows the rapid and uncomplicated programming of the procedure described above. This object-based language includes three fundamental types of objects: input objects of the data network, flow objects of the process hierarchy and knowledge objects of the class network. Flow objects can be associated with mathematical expressions. In addition, there are objects that are subordinated to these three objects.

Types of flow objects of the process hierarchy include structuring processes (called processes), selection processes (called domains) that determine the subsets of the entire object set, and variables. Processes generate, delete and modify objects and links in the entire program structure. Domains generate, modify and delete partial sets of the entire program structure. The processes are linked with domains and are then active only on the subsets of the domains. Global and local variables are used to extract data, such as strings, numbers, vectors, curves and tables, at certain places of the data network, the class network and the process hierarchy of the program structure. The extracted data is then used at other places or stored for later use by linking to objects.

The structure of the Cognition Language models an evolutionary process of cognition and interpretation. The data network, the program flow of the process hierarchy and the knowledge of the class network adapt successively to each other. In an automatic learning process, the structures of the knowledge and of the program flow adapt to each other and can then be reused with new input data sets. An interpretation process detects the "data object of interest", which is generated in the execution mode by linking the original objects to hierarchically higher objects.

The structure of the Cognition Program promotes the learning and interpretation processes by automatically segmenting the input data sets into hierarchical networks. The hierarchical networks are linked automatically with knowledge objects from the class network and with other objects to form a holistic cognition network. The linking of the cognition network changes dynamically during the program flow. The Cognition Program allows a navigational procedure in the multimodal network of objects for finding partial networks, subsets of the cognition network. This allows classification and segmentation processes to run locally on these partial networks. The Cognition Program also allows inter- and intra-network communication with the corresponding processes using variables.

During the execution mode, the Cognition Program automatically prepares links between objects and thereby generates hierarchically higher ranked objects. The Cognition Program provides the hierarchically higher ranked objects with characteristics, classifies them, and then links them again at a still higher level to other objects. The hierarchically higher ranked objects are used for rapidly finding target objects. The Cognition Program first finds more easily findable starting objects and thereby more rapidly reaches hard-to-find objects via established links. Detecting hard-to-find target objects is faster using links in a hierarchical data network than using a process-based procedure such as indexing. The links of the data network are not predetermined in a fixed manner. Rather, the links are formed based on the structures actually present in the given data sets. Thus, the Cognition Program automatically creates and deletes links between the subsets of the data network that are generated from heterogeneous, multimodal data.

The creation and deletion of the links of the data network are performed using a network navigational procedure that is capable of functioning in a multimodal manner. The links that are created automatically in the cognition network are first defined by the user navigationally along different objects and links. In addition, these new links and also the generation of new objects again generate new navigational paths. In this manner, the cognition network grows, while at the same time also being partially taken apart again. This process of building up and tearing down links is similar to the development of the human brain. In this process, both the existence or nonexistence of nodes and links, as well as the existence or nonexistence of lateral branches of a navigational path determine whether the path continues or is interrupted. A part of a navigational path can also consist of mathematically or logically linked conditions, nodes and edges of the cognition network. For example, some of the links contain mathematical operations, such as "and", "or", addition, subtraction, multiplication and division. At the end the navigational path, or even at an intermediate step of the navigational path, segmentation processes can be performed. The segmentation processes are applied to objects at some point along the navigational path or to subsets of objects determined from that point on the navigational path.

If the path is interrupted because a condition of a process step is not satisfied, then the subset for all subsequent process steps is set equal to the empty set. If the navigational path is continued up to the place of the process step, the subset of objects located by the process step of the navigational path is considered the "subset of interest" for the connected segmentation process of the domain of the process step. Subsequent process steps and sub-process steps are then applied to this subset of interest. Segmentation process steps generate and/or delete objects, links, and the groups of objects that are specified by domains. Segmentation process steps operate on objects, links, the objects of a domain, the segmentation process steps themselves, local and global variables, classes, labels, and objects generated from the data sets by combining their elements. The links that are operated upon include both the predefined links that are specified as part of the process hierarchy, as well as the links generated by the segmentation process steps. For example, where the input data sets are image objects, the predefined links include links to the direct geometric neighborhoods in the form of neighborhood lists or geometric hierarchical links. Both pre-specified and automatically generated links can be applied to other links, classes, objects, processes steps, and attributes and characteristics of nodes. Where the input data sets include image objects and metadata, process-driven links can be applied to heterogeneous objects. Thus, objects of a domain can be linked in an uncomplicated, automated manner with the objects of another domain or even with domains of a different type. An example of a segmentation process step that links objects of domains is: "link the object of the starting subset of objects of the navigational path with the objects of the final subset of objects of the navigational path."

By generating links and domains in this manner and by navigating through heterogeneous objects, table data entries, image objects and text objects located in very different places in the cognition network can be linked together. These heterogeneous objects can even be automatically linked to each other at run time in an abstract manner that is independent of the input table data. Links that have been defined in the training phase of a cognition network can be used again later for navigating through the cognition network and for defining and generating new domains and links.

Groups of linked objects can be characterized as objects having characteristics and can be linked as a group to other objects at a higher hierarchical level. In this manner, it is possible to combine objects representing two-dimensional layered images by linking objects in different layered images to form three-dimensional objects having properties such as volume. In addition, non-adjacent objects within a single image that have a relationship to each other can also be linked. For example, the object comprising the elements of a dotted line can be assigned a characteristic, such as length. Such higher-ranked objects can then also be linked to classes, local variables, text data and other table data. Even non-adjacent table values can be linked to form higher-ranked objects with characteristics. A table data value may acquire a special meaning as a result of connections to other table data values.

Within the Cognition Program, communication takes place through links and through variables. Expressions are small mathematical partial networks that are assigned a name and are linked by their name to any place in the Cognition Program. Links specified using a formula editor can be established between all the mechanisms of the cognition network, such as user-specified class descriptions, process steps, subprocess steps, domains, algorithms, threshold values, characteristics, and all of the possible mathematical and logical operations, such as addition, subtraction, multiplication, division, log, exp, sin, not-and and not-or. Using the formula editor, the user assigns a name to each expression and can reuse the expression at any place in the Cognition Program. The user can also assign names to subroutines of process steps (partial program flows) and can use the subroutines as customized algorithms. In addition to linking a class to a process step, the user can also embed a customized algorithm within a class specification. This allows the user to specify a class in more detail than by generating a cognition function by mathematical linking. By embedding a customized algorithm in a class specification, the user can write a subprogram in Cognition Language for the computation of a complex characteristic of the class.

Embedding a customized algorithm in a class specification represents a "higher cognition function" that is not programmed in C++ but rather in Cognition Language. Expressions can be formulated independently and used at different places. Generating an expression using the formula editor and thereby embedding an algorithm in a class also allows the user more clearly to separate program flow from knowledge by avoiding a link between an algorithm of a process step and a class. Yet communication between program flow and knowledge can nevertheless be independently improved. In some applications, it is advantageous to split a class description into several expressions. In an image analysis application, for example, a class description can be split into an expression with a shape description of the object and another expression with a color description. It may also be advantageous to specify only partial aspects of a class description at different places in the Cognition Program.

The separation of program flow and knowledge is particularly helpful when the Cognition Program is being trained to be adapted to a new type of input data set but for an existing application. In this situation, a professional Cognition Language programmer would change as little as possible to the process steps of the program flow and primarily adapt the expressions in the classes to the new type of input data set. Then a user of the Cognition Program solution, that is a non-Cognition Language programmer, would be in a position further to adapt the Cognition Program solution merely by optimizing the expressions to the new data sets without having to understand the program flow. Changing the expressions is simpler than changing the program flow. But because the expressions are used when a process step operates on a class, the user has indirectly modified the program flow without having noticed it at all.

The Cognition Language includes arithmetic/logic expressions and procedural expressions. Expressions have unique names. Arithmetic/logic expressions are formulated as formulas and include "ClassDescriptions", "Cust Arth Features" and thresholds. These expressions allow the definition of rules, their logical linking, as well as mathematical operations, such addition, subtraction, multiplication, division, log, exp, and sin. Procedural expressions are formulated in the process language and include "CustAlg" and "CustRelationalFeatures".

Arithmetic/logic expressions can be used as features or fuzzy conditions. A feature is computed as a property of an object. Features include "ImageO", "returns double", link, class, and process step. Fuzzy conditions include thresholds, which are simple special cases of a fuzzy condition. Procedural expressions can be used as features, algorithms, domains process step and fuzzy conditions. An example of an algorithm that is a procedural expression is an algorithm that modifies the network structure by generating, modifying or deleting objects, links or attributes. A feature that is a procedural expression computes a characteristic of an object, such as "ImageO", "returns double", link, class, and process step. A domain that is a procedural expression describes a set of objects on the basis of the network structure, taking into consideration a current processing state. A threshold is an example of a fuzzy condition that is a procedural expression.

A domain specification includes a description of a local or global network structure, as well as an expression, such as a fuzzy condition. A local network structure includes current objects, neighbors, super-objects and sub-objects. A global network structure includes all the objects, all the classes as well as the image object level A class can store an arbitrary number of named expressions. Classes can have predefined names. Classes are used to classify the current class description of objects. Classes can perform a segmentation process on the objects or a generalization process on the objects.

The Cognition Program can perform class centric development. For example, class centric development can be performed on all objects at the image object level that exhibit a membership to the expression "nuclei.classify>0.2: assign nuclei". Class expressions can be addressed via "class_name". "expression_name". Class expressions can initialize placeholder expressions. In addition, class centric development can be performed on all objects at the image object level that are assigned to the expression "nuclei: apply nuclei.generalize".

A second type of program-internal communication occurs by means of variables. The variables can be understood to be containers that take information from program objects and links and make the information available to other program objects and links. The information can also be stored in the other program objects and links. In the case of storage, the variables are local variables or object variables. Where the information is made available to the other program objects and links, the variables are global variables or scene variables.

Global variables primarily have the task of program-internal communication. Local variables, on the other hand, primarily store a result once the result has been determined, linked with objects of the cognition network, and made available for later communication. The storage of results in objects or links can have several purposes. On the one hand, the computational effort required to compute a result can be very large, and the result may be needed at several places of the program flow. If the values are stored locally, the computation need be carried out only once, and the values can always be retrieved again. On the other hand, it may be the case that a new computation of the results at a later time in the program flow is no longer possible. Because the entire program object network is dynamic and relationships and objects of the cognition network change continuously, the results of computations will also change. However, old results can be important, for example, if the evolutionary history of an object is used as a foundation of a segmentation decision.

Global variables are used most effectively with corresponding segmentation processes when the contents and values of the global variables can be extracted, used or stored. Therefore, global variables should be capable of receiving all the relevant data in the program network. Accordingly, the extraction, use and storage of global variables should be such that these actions can also be formulated as segmentation processes. For example, access to the class network must be possible in order to allow changes in the class network to flow automatically in the process hierarchy. In text analysis, it must be possible to write the names of the classes (or the concepts in the ontology) as a string into a variable and to compare this string with the text contents, or the words, of the text input data.

This procedure contains two types of process steps: "write class name as a string in a variable" and "compare in the form of a condition" the content of the variables with text objects. Examples of the condition are "equals" and "fuzzy comparison". At first glance, this procedure does not seem to make sense because one could in fact use the class name directly in the program flow, without having to involve the class network. However, this presupposes that the Cognition Language programmer knows all the entries of the class network, including future ones. Requiring the Cognition Language programmer to know all entries in the class network, however, is undesirable. As already mentioned above, the class network can change at run time. In that case, one would not want to have to look at all the corresponding places in the process steps of the process hierarchy to change all the corresponding entries of the class network there as well. The Cognition Program allows this to take place automatically. The updating of the entries of the class network in the process hierarchy is implemented via navigation and domains in the following manner, as explained using the example of a text.

Just as one can process only certain objects in the input data selectively over the domain without knowing precisely which ones occur very concretely in a concrete analysis, or which ones can only be formed by segmentation process, one can also find and process unknown classes, processes, domains, expressions or variables via the described navigation. For input objects, one frequently uses navigation through classes and expressions. All input objects that are linked to a certain class and satisfy certain conditions represent the domains and are processed further. Thus, the navigation here proceeds from classes via classification links to the input objects. One can also proceed similarly for classes if one navigates from more abstract classes to more concrete classes.

For example, if at a place in the process hierarchy for analyzing a text that refers to proteins from a cell biological point of view, protein names should be interpreted automatically. Then one should also be able in the program to handle the abbreviations of the proteins. These abbreviations typically consist of only three letters and thus are very ambiguous. It is possible now to look up all the abbreviations in the input text, without knowing them in advance. The abbreviations only have to be linked in the class network with other and finally more abstract classes. Then, the navigation and thus the definition of the domains can be carried out via these links. Thus, if the abbreviations that occur in the input text are also mentioned in the ontology and connected, then one can reach this partial set of words in the text. For example, an abbreviation may be connection via hierarchical links to the class and the concept "protein", and one can reach the abbreviation as a domain, by navigation "to all the proteins," followed by the hierarchical link "is special," and with the condition "number letters <4,". Then, via the segmentation process, one can establish the classification link between the class "protein abbreviations" and the protein abbreviations that occur in the input text. After the initial steps, many of the links may be incorrect because abbreviations of other terms are also linked. Later, however, other processes can be used for correction.

Various types of process steps are used for generating classification links. A classification link can be generated by a fixedly installed "string match" process if the class name agrees with the name in the text. Or a variable can be provided with the name of the concepts as "values", and the abbreviations can be provided with a label under the condition "value of the variable=word string." This labeling is a forced classification because the abbreviations can now be found again very rapidly via the links that have been established with the labels. For example, labeling with the name "abbreviation of proteins" functions like an index. An example of a simple formulation of the domains is: go to class "abbreviation of proteins" in the class network and then via classification or labeling links with the input objects. Those program flows that are established specifically for abbreviations can all run in this domain, which can be found very rapidly due to this quasi indexing procedure.

In this context, the variables need not to be only numbers or strings. When training a program and also during the normal program flow, it is appropriate and more convenient also to allow tables, vectors, variable sets, and even data blocks, such as images or texts, to be the contents of variables. This permits the program-internal communication of these data. A set of variables, like all variables, has a name and constitutes a set of variables plus their values.

In this sense, a representative image or a pattern outline of an object to be found in an image can represent a local variable in the class network (the knowledge hierarchy). If needed, this variable can be retrieved by navigation, transported to certain image objects, and used there for a segmentation process. An example of such a segmentation process is classification by determining the best scaling and rotational variations of coverage. The same applies to tables or texts or other data, such as, DNA codes. Table examples, text examples and a DNA code example can be used as a sample and compared with a concrete input object that has already been segmented. This segmentation process step of comparison is then usually not merely simple matching, rather it is a match that allows for distortions.

During the automatic or semiautomatic training of the Cognition Program, the desired final results are communicated in any form to the program. By a hierarchical annotation, a user can establish which type of objects are to be found. This can also occur interactively, where the user then applies certain processes with varying parameters to a data set. The user may manually label objects. After the user specifies which objects are to be found, the desired objects are generated. The automatically found, correct, objects can also be labeled by the user. The program can then automatically extract parameters from these labeled objects and carry out new process steps with these parameters. The new process steps, in turn, lead to objects that also can be labeled. Finally, at the end of this action, a parameter set is available that represents an optimized process hierarchy as determined by the optimal agreement with the labeled objects (best overall classification of all the objects). In these parameters, segmentation and flow parameters (also classification) can be contained for all the objects. As a result, it can also be established which expressions, classes and process blocks should be active, and in which sequence. It should be noted that the cognition network contains characteristics for all the objects. Thus, for an auto-learning Cognition Program, segmentation processes or blocks must be classifiable based on characteristics, such as process run time.

In some case, a large number of parameters must be trained because a plurality of objects are to be found, as opposed to just one type of object (one class). Consequently, if the number of the parameters is immense, it makes sense to structure variables with their values hierarchically in the form of groups having their own names. Parameter sets, however, are more than hierarchically structured variables because different parameter sets may contain the same variables with different values. Such a parameter set is an n-dimensional vector with a number n of values with freely selectable dimensions (represented by the names of the variables). If a parameter set is activated, the values of the set are automatically written into the associated variables. This means that at different places of the program flow different parameter sets can be active. These different parameter sets my have the same variables with different values.

The contents of table data can be automatically interpreted using knowledge-driven segmentation. In the case of a table calculation, the Cognition Program automatically generates non-predefined sense objects and sense relationships between subsets of the data. The objects and links that are generated automatically can be written in the class network, a knowledge structure. Sense objects can also be objects whose sole function is to be intermediate objects that permit the segmentation of the actual objects. The type of the objects that are to be segmented can thus automatically be formulated in an abstract manner in the form of a hierarchical knowledge network (the class network) separately from the remaining process flow (the process hierarchy). Thus, the table calculation performed by the Cognition Program differs dramatically from conventional table calculations.

Automatically generated links are used for classifying and rapidly locating sense objects to be processed. A sense object can be a non-predefined segment of a row or a column. In addition, a sense object can be merely an abstract object that is described by the class network and defined by the process hierarchy and that consists of hierarchically linked rows or columns or segments thereof. In a multimodal approach, such a sense object consists of multimodal parts, such as an image, a text and table segments.

The already existing cognition network is required for this purpose. In addition, special, table-specific structures are also needed. These special structures include optional transformations of tables into images with thematic planes. The special structure are able to process tables in the same cognition network as the images. This simplifies the data integration and the operating ease because most functions are needed only once for both applications.

Transferring sense objects from one data table into a new data table makes the processing of table data more user friendly. For example, sense objects can be transferred from images generated from data table plus thematic levels. The following segmentation process steps can be used: (i) "generate empty table with row length x and column length y", (ii) "define sense object Y (table subset) as sense table Z", (iii) "write sense table in local variable LV", (iv) "fill empty table with contents of LA", and (v) "write contents of LA into empty data table in positions x, y". Therefore, variables are also able to contain tables, in addition to numbers and letter strings. It is also possible, although more cumbersome, to transfer each entry using domain navigation of the sense object to the desired place in the empty data table. In that case, it is sufficient to have string and number contents of variables.

In table calculations, as in image analysis, conventional processes, such as averaging or edge filters, are also used by the Cognition Program. Multiplication of rows and columns with each other, or general mathematical operations applied to rows and columns, as well as resorting of rows and columns, are available as segmenting process steps.

It is possible to structure tables hierarchically via domains and navigation. For navigating, the following types of formulations are possible: "go to the column with a name XYZ and with a characteristics expression column length=10 and column average<100, from there go to the left adjacent column, from there along the hierarchical link 'is a part of' to the super-object and from there along all the links 'has parts' to all the sub-objects." This subset of the table, which is located at the end of the navigation, represents the domain on which a segmenting process step named "find the table entry in the domain with the maximum value" can occur.

The classification of sense objects formulates classes from sense objects with expressions as contents (or classes linked with expressions). The Cognition Program can formulate the following expression: "sense object ABC has, as sub-objects, the objects which are classified as KLM and those classified as NOP with the characteristic D of the KLM object <5 and the characteristic E of the NOP objects >100." Fuzzy characteristics can also be formulated.

By linking two-dimensional object, the Cognition Program automatically segments, analyzes and interprets complex three- and multi-dimensional images. In addition to the usual three-dimensional segmentation processes, the Cognition Program can segment into layers and classify a four-dimensional image comprises of a three-dimensional image that changes over time. The Cognition Program then generates three- and four-dimensional objects by linking two-dimensional objects. This process is evolutionary and involves switching back and forth from the analysis of two-, three- and four-dimensional objects. The layered structures can be represented as an image with different tiles, or as a number of images that are sorted or labeled based on their geometric, four-dimensional, position. Characteristics are defined that automatically link two-dimensional objects to form three- and four-dimensional objects. Examples of such characteristics are the volume or the velocity of an object.

The intelligent segmentation of multi-dimensional images provides the ability to visualize the image contents in multi-dimensional images. The different objects of interest can be represented in different colors in three and four dimensions. The less interesting objects can be represented transparently as desired.

The Cognition Program performs automatic data integration by linked, simultaneous analysis and interpretation of different or heterogeneous table data and other types of data, such as, texts, numbers, vectors, spectra, images and presentation documents. The Cognition Program even analyzes structures internal to the Cognition Language, such as concepts and program flows. Diagrams are generates for visualizing the results of the Cognition Program.

The Cognition Language is a new computer language for preparing auto-learning programs. As already mentioned above, the input data can be annotated and the training results (learning results) can be stored in the form of tables or parameter sets. No other specifications of the Cognition Program are needed to store the training results, exception is the case of extremely complex parameter sets. If the number of the parameters to be tested is very large, it is no longer possible to run through all the combination possibilities in a reasonable time. In that case, the Cognition Program uses evolutionary and genetic algorithms.

The Cognition Language has the following properties:

1) The language is expanded to include global variables, which can transport, with the help of appropriate process steps, information of different types (such as strings, vectors, tables) between and within the class network (the world knowledge), the process hierarchy and the input data. Thus global variables can transport information between all objects of the cognition network.

2) The language can segment and classify process steps and classes.

3) The language can generate links between all of the objects of the cognition network in a process-driven manner.

4) The language processes linked objects as hierarchically higher ranked objects that possess properties. The higher ranked object in turn can be linked to hierarchically higher objects.

5) The language allows the Cognition Network to specify a domain as a subset of the class network or a subset of the process hierarchy, taking into consideration links generated by the Cognition Program.

6) The language can operate on heterogeneous tables of all types, including tables with business intelligence. The operations that can be performed on the heterogeneous tables include subject-specific processes and computations based on object characteristics.

7) The language can process n-dimensional images and tables due to the possibility of loading several images or tables and linking them and their objects procedurally. In addition, an image can be loaded as a table.

8) The language provides the Cognition Program with the ability to load and process multimodal data by multimodal navigation and domains. Thus, the Cognition Language has the ability to exclude very heterogeneous subsets from multimodal data by multimodal navigation. Segmentation process steps can raise-multimodal domains to the level of objects, and the latter can be further segmented and classified with multimodal expressions and characteristics.

The cognition language makes it possible to prepare software solutions for the interpretation of complex data sets. It is constructed specifically for problems that do not have unique solutions. An example of a unique solution is the sum of a column in a table, or finding the largest numerical value in the table (which may be represented in one or more entries). All the computers in this world, unless they are defective, will reach the same result for the same table. However, in cases where the number of the calculation operations required for a unique result becomes unmanageably large, new solution paths have to be taken. The question "what is the optimal move in a given situation of a chess game?" is answered differently by different computers. Considering that no computer can calculate all the possible chess moves, the answer depends on how many moves the computer can calculate in advance within an acceptable time and the strategies with which it is equipped. In this context, it is often even impossible to prove which strategy is unequivocally the better one. An even more dramatically sharpened situation exists in the case of cognition problems. The content of a complex table will probably be interpreted in a hundred different ways by a hundred different people, and conventional computer programs can only provide a very primitive interpretation.

Another example of an incalculable problem is the number of the possibilities of combining pixels of an large digital image to form various objects. The number of possible combinations is so large that no computer can produce all the possible objects and examine their properties. Thus, except for trivially small digital images, no computer can find the uniquely "best" set of objects for an image. This inability to calculate the optimal solution applies particularly to cases where the meaning of number blocks (or image objects) can be defined only by way of the relationships with other number blocks (or image objects). In such cases, the number of combination possibilities explodes to an immeasurable scale. Thus, it is the complexity of the task that is responsible for the difference between a table calculation and a table interpretation.

Nature has developed a strategy for such incomputable situations—the evolution in small steps through primitive life forms to more complex life forms. The Cognition Language offers a language that, in a natural manner, allows evolution in small steps from primitive interpretation blocks within data structures to more sophisticated ones. In this procedure, individual process steps are applied to the interpretation blocks. Different interpretations (even if they are still primitive) require different process steps.

In this context, a primitive interpretation block can be a single number of a table if that number differs drastically from the other numbers. However, this number is a component of a larger unit, for example, a column. Thus, the entire column may be of special significance and therefore also require special processing. However, it may also be necessary that other columns, which are in a special relationship with the former column, also need to be subjected to special (possibly different) processing.

The concepts, labels, and domains of the Cognition Language allow local processing and the stepwise development from the simple to the more sophisticated. The separation of knowledge in the class network from the processes in the process hierarchy increases the orderly arrangement of the program and it simplifies the programming and its optimization, as well as the search for errors.

Tables and digital images have a similar structure. Both consist of an n-dimensional ordered field of numerical values. In images, besides pixels, the image objects play decisive roles. In tables there are, besides the numbers, above all rows and columns. Image objects are typically difficult to extract, while the rows and columns, on the other hand, are given. However, the rows and columns are far from being the only interesting objects in tables. A column or a row can contain unidentified sub-objects. For example, in the monthly sales of a company, there may be an abrupt change in the numerical values. This can have been triggered by an event, which may or may not appear explicitly in the table (for example, a marketing activity). In any case, there is a time before and a time after the event such that the column can be subdivided into two sub-objects, one with a higher average value and one with a lower average value. It may make perfect sense for the interpretation of a table to process these sub-objects, and to establish a relationship between them and other objects (the marketing activities). Taking into account the sales of the previous years may also make sense. Thus, the result is a multiple-scale segmentation problem that is similar to that encountered in image analysis, although in this example it has only one dimension.

For images, depending on the dimension of the image, n-dimensional neighborhoods play a large role. This is of little significance for tables, although tables may have some significance especially if the rows and columns can be sorted by different criteria. Sorting modifies the table and, in analogy to image analysis, can be considered a special pixel filter. Then it may make sense to segment two-dimensional objects, for example, areas in which the profits, sales, marketing activities and other sectors are simultaneously at a high level. In practice, two- or three-dimensional table problems, similar to those encountered with images, however, occur without sorting. For example no sorting is required if a parameter of a measurement value increases or decreases in small increments in a row and another parameter also decreases or increases in relatively homogeneous increments in the columns. However, this will normally not be the case, and immediate neighborhood in tables will typically be of significance only in the one-dimensional case. Nevertheless, there are higher ranked objects whose entries can be distributed over the entire table. Therefore, it is important to be able automatically to interlink data objects if together they constitute a sense object after an automatic classification analysis.

This can be considered a possibility for multi-dimensional segmentation of objects. In this case, one could establish a link between the temporal segments with high marketing activity with the temporal segments with high sales and the temporal segments with high profits. This network could be transformed into a hierarchically higher object and linked in the world knowledge with the class "marketing success". This classification can occur automatically by having the class marketing success satisfy certain object descriptions (expressions). Expressions are based on object property computations (features) and they can consist of fuzzy descriptions or simple conditions, such as the ratio of marketing cost to profit increase in the case of an abrupt change of less than 0.01. A class can result from the logical linking of many expressions. The comparison of the expression logics with the concrete objects yields a classification probability that, in the mentioned example, describes the magnitude of the success. In this manner, all the marketing successes (for example, since the formation of the company) with a classification probability of more than 0.5 can be found by segmenting and subsequently classifying objects. The objects can in turn again be linked to each other and form an object on an even higher level. The individual marketing successes can be compared to each other and again set in a relationship with other higher objects to find additional correlations.

The advantages of using domains can also be explained in this example. The objects "marketing successes" were not present in the original data; they were generated for the first time by the Cognition Program. Now they can be used as domains. Domains lead the process steps to the correct places within the data network. In our example, the domain description would be as follows: "go to all the marketing successes (class description of the domains) with a classification probability of more than 0.7 (condition for great successes) in the period after Jan. 1, 2000 (2nd condition, date of foundation of company), and allow the process to be active." The process step can include the computation of a number, for example, the variance of the ratio of the marketing cost to company sales. Here it is assumed that it is possible to establish, in the program, formulas that are based on features and variables (formula editor). As a result, one obtains a measure of whether there is a linear link between the marketing cost and the company sales.

A process hierarchy that performs the above-mentioned process is as follows. A first process step has the domain: go to all the marketing successes (with the corresponding conditions). The first process step has no process activity. A second process step (a sub-process step) has the domain: go to the sub-object marketing cost. The second process step has the process activity (algorithm): write the value of the features "total marketing cost" into the global variable "marketing cost". A third process step has the domain: go to the sub-object sales; and the process activity: write the value of the feature "total sales" into the global variable "sales". A fourth process step has no domain specification and the following process activity: apply division to the global variables "marketing cost" and "sales" and write the result into the global variable "ratio". A fifth process step has the domain: go to the super-object (marketing success); and the process activity: write global variable "ratio" into the local variable "marketing cost/sales". The sixth process step, which is not a sub-process step of the first process step, has the domain: go to all the marketing successes as before. The sixth process step has the process activity: calculate the statistical value of the standard deviation of the local variable "marketing cost/sales" and write the result into a global or local variable with an appropriate name.

Returning to FIG. 19, which shows magnetic resonance images of a human head, two columns of six slices and two columns of an enlarged segmentation result of three images can be seen. The enlarged slices include the segmentation result and show the left and right ventricles and the white brain substance. In the column of six slices, the left ventricle sections can be linked to each other, and the total volume of the left ventricle can be determined. The linking can be visualized by clicking on a single section of the object with a computer mouse. Then, all the objects that are linked to the former object can also be labeled automatically at the same time. In this manner, one can verify whether the linking has worked as desired. A similar implementation can also be carried out for other data, such as texts or tables.

The Cognition Program also allows the calculation of table data. To perform a table calculation, a row segment is clicked, and those segments linked with this segment are also selected automatically. A hierarchically higher ranked object can then be visualized on the user interface. Geometrically higher ranked objects can be represented with color coding. For example, by clicking on a brown field, the entire brown field is labeled. The brown field is then available as an object for domain navigation. It is also possible to have the numbers be represented directly.

In the context of the process hierarchy, the question of operational flow control (run time environment) may also be important. In this regard, a number of alternatives or additions are provided. The Cognition Program allows iterative processing of heterogeneous mass data from heterogeneous data sources for extracting user-specific, relevant information such as parameters and diagrams). The processing assigns data to objects and generates, deletes and links objects and subsets of objects. The processing also restricts the application of processing instructions to certain dynamically generated object sets (domains). The objects and processing instructions can be represented graphically or textually, and they can be edited by the user.

COMPACT DISC APPENDIX

The Compact Disc contains:

A) the file named mamma-v002.txt (202 KB, written to disc on Aug. 28, 2006) which is an ASCII version of the XML representation shown in part in FIGS. 24-25;

B) the file named cell-biol-3d-v4.txt (128 KB, written to disc on Aug. 28, 2006) which is an ASCII version of the XML code that generates the visual representation of FIG. 21; and C) a file named CD Appendix Title Page.txt, which has 195 bytes and was written to disc on Aug. 28, 2006.

Although the present invention has been described in connection with certain specific embodiments for instructional purposes, the present invention is not limited thereto. For example, although embodiments of the Cognition Program and computer-implemented network structure have been described above in relation to the computer-aided detection of breast cancer shown in mammograms, the Cognition Program and network structure can equally be applied to detecting and analyzing target patterns in digital imagery of geographical objects, military targets and weather patterns. The Cognition Program and network structure can be used to detect and analyze radar and sonar shadows of airplanes, ships, submarines and schools of fish. The Cognition Program and network structure can also be used to detect and analyze anatomical regions other than the human brain and breasts. For example, the Cognition Program can be used to detect and analyze cancerous regions in human lungs. Accordingly, various modifications, adaptations, and combinations of various features of the described embodiments can be practiced without departing from the scope of the invention as set forth in the claims.

What is claimed is:

1. A method comprising:
in a specification mode:
specifying a class network having a class, wherein a membership function defines a likelihood that an object of a data network belongs to the class;
specifying a process step having a domain and an algorithm, wherein the domain designates the class, and wherein the process step is part of a process hierarchy;
specifying a link type that defines a relation between the class and the object;
in an execution mode:
acquiring table data values; and
executing the class network and the process hierarchy on a computer that implements the data network by generating the object of the data network and by selectively linking selected table data values to the object according to the class network and the process hierarchy.

2. The method of claim 1, wherein the table data values include patient data and pixel values of a medical image of a patient, wherein the patient has a gender, an age, a weight, a height, blood values, prescribed medications, a number of children, a family history of ailments, a history of breastfeeding, a history of smoking and a history of drug use, and wherein the patient data is taken from the group consisting of: the gender, the age, the weight, the height, the blood values, the prescribed medications, the number of children, the family history of ailments, the history of breastfeeding, the history of smoking, the history of drug use, and tissue analysis results of the patient.

3. The method of claim 2, wherein the medical image of the patient is a mammographic image of the patient's breasts.

4. The method of claim 1, wherein the specifying the process step is performed by a user by selecting the process step from a library of predefined process steps.

5. The method of claim 1, wherein a first plurality of the table data values are spectral intensity values of a digital image, and wherein a second plurality of the table data values are items of metadata relating to the digital image.

6. The method of claim 5, wherein the digital image is an image from an airborne sensor.

7. The method of claim 5, wherein the class network, the process hierarchy and the data network together form a semantic network, and wherein the process step is linked to one of the items of metadata.

8. The method of claim 1, wherein the domain designates a scheme for navigating from the object to a second object.

9. The method of claim 8, wherein the object and the second object exhibit object properties, and wherein the scheme for navigating uses constraints on the object properties to navigate from the object to the second object.

10. The method of claim 1, wherein the table data values comprise pixel values from a plurality of parallel planar scans of a three-dimensional physical object, wherein the executing that implements the data network includes generating sub-objects by linking selected pixel values of the scans to the sub-objects, and wherein the executing that implements the data network includes linking the sub-objects of adjacent scans.

11. The method of claim 10, wherein the linked sub-objects of adjacent scans represent an internal organ of a human body.

12. The method of claim 1, wherein the table data values comprise values associated with a plurality of scans taken at different time intervals, wherein the executing that implements the data network includes generating sub-objects by linking selected values in each of the scans to the sub-objects, and wherein the executing that implements the data network includes linking the sub-objects of scans taken in adjacent time intervals.

13. The method of claim 12, wherein the linked sub-objects of scans taken in adjacent time intervals depict a movement of a cell.

14. The method of claim 12, wherein the plurality of scans taken at different time intervals is a video movie depicting movement of a moving object, and wherein the moving object is taken from the group consisting of: a worm, a fish, a bacterium, a cell, a person, a motor vehicle, a boat, and an airplane.

15. The method of claim 1, wherein the table data values comprise values from a first group of parallel planar slices of a three-dimensional data set of a physical object taken at one time and from a second group of parallel planar slices of the three-dimensional data set of the physical object taken at a different time, and wherein the values from the first group and the second group of parallel planar slices depict movement of the physical object.

16. The method of claim 1, wherein the executing that implements the data network comprises:

classifying whether each of a plurality of objects of the data network belongs to the class designated by the domain of the process step;

performing the algorithm on each of the plurality of objects that belong to the class;

automatically generating a second class that is part of the class network, wherein the domain designates the second class instead of the class; and performing the algorithm on each object of the plurality of objects that belong to the second class.

17. The method of claim 16, wherein the executing that implements the data network further comprises:

deleting the class from the class network.

18. The method of claim 1, wherein program instructions stored on a computer-readable medium perform the algorithm on the object that belongs to the class, further comprising, after the executing that implements the data network:

in the specification mode:
specifying a second class of the class network; and
in the execution mode:
re-implementing the data network by selectively linking table data values to objects that belong to the second class, wherein the program instructions are not re-compiled before the program instructions perform the algorithm on each of the objects that belong to the second class.

19. The method of claim 1, wherein the table data values linked to the object are spectral intensity values of a digital image that depict calcifications in a human breast.

20. The method of claim 1, wherein the object represents a cancerous region in a human body.

21. The method of claim 1, wherein performing the algorithm in the execution mode generates a link of the link type between the class and the object.

22. The method of claim 1, further comprising:
in the execution mode:
retrieving the object that belongs to the class designated by the domain of the process step; and
performing the algorithm on the object.

23. The method of claim 1, further comprising:
in the execution mode:
retrieving the object that belongs to the class designated by the domain of the process step; and
performing the algorithm on the table data values linked to the object.

24. The method of claim 1, wherein the data network has a second object, further comprising:
specifying a second link type that designates a second relation between the object and the second object.

25. The method of claim 1, wherein the class network has a second class, further comprising:
specifying a second link type that designates a second relation between the class and the second class.

26. The method of claim 1, wherein the domain designates the link type.

27. The method of claim 1, further comprising:
specifying a second link type that defines a relation between the object and a second object, wherein the specifying the second link type includes specifying link properties, wherein the domain designates a scheme for navigating from the object to the second object, and wherein the scheme for navigating uses constraints on the link properties to navigate from the object to the second object.

28. The method of claim 1, wherein the specifying the link type is performed by a user by selecting the link type from a library of predefined link types.

29. The method of claim 1, wherein the domain designates a scheme for navigating from the class to a second class.

30. The method of claim 29, wherein the specifying the class network includes specifying class properties, and wherein the scheme for navigating uses constraints on the class properties to navigate from the class to the second class.

31. The method of claim 1, wherein a first plurality of the table data values are spectral intensity values of a digital image, wherein a second plurality of the table data values are items of metadata relating to the digital image, and wherein the class is linked to one of the items of metadata.

32. A method comprising:
in a specification mode:
specifying a class network having a class, wherein a membership function defines a likelihood that an object of a data network belongs to the class;
specifying a process step having a domain and an algorithm, wherein the domain designates the class, and wherein the process step is part of a process hierarchy;
specifying a link type that defines a relation between the class and the object;
in an execution mode:
acquiring table data values; and
executing the class network and the process hierarchy on a computer that implements the data network by generating the object of the data network and by selectively linking selected table data values to the object according to the class network and the process hierarchy, wherein a first plurality of the table data values are morphological values that indicate cell states in a cell assay, and wherein a second plurality of the table data values are items of metadata relating to the cell assay.

33. The method of claim 32, wherein one of the items of metadata is taken from the group consisting of: a type of cell, a drug applied to a cells in a well of a microtiter plate for the cell assay, a dosage of the drug, and a time of exposure to the drug.

34. A method comprising:
specifying a class network having a class, wherein a membership function defines whether an object of a data network belongs to the class;
specifying a process step having a domain and an algorithm, wherein the domain designates the class, and wherein the process step is part of a process hierarchy;
receiving pixel values obtained from a digital image;
receiving metadata relating to the digital image; and
executing the class network and the process hierarchy on a computer that implements the data network by selectively linking a plurality of objects to the pixel values and to the metadata according to the class network and the process hierarchy, wherein the process step is linked to the metadata.

35. The method of claim 34, wherein the digital image is a mammogram.

36. The method of claim 34, wherein the object of the data network belongs to the class and is linked to pixel values that depict a micro-calcification in a human breast.

37. The method of claim 34, wherein a group of the plurality of objects belongs to the class, and wherein the domain designates the class as well as each of the plurality of objects that is linked to any object of the group of the plurality of objects.

38. The method of claim 34, wherein the digital image depicts a breast of a woman having an age, a weight, a height, blood values, prescribed medications, a number of children, a family history of ailments, a history of breastfeeding, and a history of smoking, and wherein the metadata is taken from the group consisting of: the age, the weight, the height, the blood values, the prescribed medications, the number of children, the family history of ailments, the history of breastfeeding, and the history of smoking.

39. The method of claim 34, wherein the executing that implements the data network comprises:
   classifying whether each of the plurality of objects belongs to the class designated by the domain of the process step;
   performing the algorithm on each object of the plurality of objects that belongs to the class;
   automatically generating a second class that is part of the class network after performing the algorithm on each object of the class, wherein the domain designates the second class instead of the class; and
   performing the algorithm on each object of the plurality of objects that belongs to the second class designated by the domain of the process step.

40. The method of claim 39, wherein the performing the algorithm on each object of the plurality of objects that belongs to the class yields a first result, and wherein the performing the algorithm on each object of the plurality of objects that belongs to the second class yields a second result, further comprising:
   comparing the second result to the first result.

41. The method of claim 39, wherein program instructions stored on a computer-readable medium perform the algorithm on each object of the class, and wherein the program instructions are not re-compiled before the program instructions perform the algorithm on each object of the second class.

42. The method of claim 34, wherein the executing that implements the data network comprises performing the algorithm on each object of the plurality of objects that belongs to the class, and wherein the performing the algorithm yields a result, further comprising:
   determining based on the result whether the objects that belong to the class depict a target region on the digital image; and
   repeatedly respecifying the class network and performing the algorithm until the objects that belong to the class depict the target region.

43. The method of claim 34, further comprising:
   determining whether objects belonging to the class depict a target region on the digital image, wherein the target region shows a cancerous mass lesion in a human breast.

44. The method of claim 34, further comprising:
   determining whether objects belonging to the class depict a target region on the digital image, wherein the digital image is a satellite image, and wherein the target region shows a ship.

45. A non-transitory computer-readable medium comprising program instructions for performing the steps of:
   receiving a specification of a class network having a class, wherein a membership function defines a likelihood that an object of a data network belongs to the class;
   receiving a specification of a link type that defines a relation between the class and the object;
   receiving a specification of a process step having a domain and an algorithm, wherein the domain designates the class, and wherein the process step is part of a process hierarchy;
   acquiring table data values; and
   performing process steps of the process hierarchy to generate the data network, wherein the data network is generated by generating the object of the data network and by selectively linking selected table data values to the object according to the class network and the process hierarchy.

46. The computer-readable medium of claim 45, wherein the process hierarchy and the class network are depicted in a graphical user interface, and wherein the process hierarchy and the class network can be edited in the graphical user interface.

47. The computer-readable medium of claim 46, wherein the specification of the process step is selected by a user from a library of predefined process steps.

48. The computer-readable medium of claim 45, wherein a first plurality of the table data values are spectral intensity values of a digital image, and wherein a second plurality of the table data values are items of metadata relating to the digital image.

49. The computer-readable medium of claim 48, wherein the digital image is a mammogram.

50. The computer-readable medium of claim 48, wherein the class network, the process hierarchy and the data network together form a semantic network, and wherein the process step is linked to one of the items of metadata.

51. The computer-readable medium of claim 45, wherein the process step performs the algorithm on each object of the class, wherein a user inputs a second membership function at run time that defines whether each object of the data network belongs to a second class of the class network, and wherein the process step is performed by program instructions that are not re-compiled before the program instructions perform the algorithm on each object of the second class.

\* \* \* \* \*